US012761889B2

(12) United States Patent
Morse et al.

(10) Patent No.: US 12,761,889 B2
(45) **Date of Patent: *Oct. 13, 2026**

(54) APPARATUS AND METHOD FOR CERTIFICATION OF SOFTWARE WITHIN VIRTUAL INTEGRATION ENVIRONMENTS

(71) Applicant: Parry Labs, LLC, Alexandria, VA (US)

(72) Inventors: David Morse, Monument, CO (US); David Walsh, Alexandria, VA (US)

(73) Assignee: Parry Labs, LLC, Alexandria, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/889,265

(22) Filed: Sep. 18, 2024

(65) Prior Publication Data

US 2026/0079685 A1 Mar. 19, 2026

(51) Int. Cl.
*G06F 8/60* (2018.01)
*G06F 11/3604* (2025.01)

(52) U.S. Cl.
CPC ............ *G06F 8/60* (2013.01); *G06F 11/3612* (2013.01)

(58) Field of Classification Search
CPC ............................... G06F 8/60; G06F 11/3612
See application file for complete search history.

(56) References Cited

U.S. PATENT DOCUMENTS 9,183,118 B2 11/2015 Randimbivololona
9,495,283 B2 * 11/2016 Alger .................. G06F 11/3696
10,445,086 B2 10/2019 Jozsa et al.
10,757,133 B2 * 8/2020 Lietz .................. G06F 11/3698
11,507,355 B2 11/2022 McKay et al.
11,799,670 B2 10/2023 Srivastava et al.
12,181,997 B1 * 12/2024 Walsh .................. G06F 11/328
12,367,125 B1 * 7/2025 Forino .................. G06F 11/302
12,452,401 B1 * 10/2025 Lawson .................. G06F 3/011
(Continued)

OTHER PUBLICATIONS

Dorobantu et al ;validating uncertain aircraft simulation models using flight test data, 9 pages (Year: 2013).*
(Continued)

*Primary Examiner* — Ted T. Vo
*Assistant Examiner* — Brahim Bourzik
(74) *Attorney, Agent, or Firm* — Caldwell LLC

(57) ABSTRACT

An apparatus for certification of software within virtual integration environments, the apparatus including a processor and a memory communicate connected to the processor, the memory containing instructions configuring the processor to receive a software package for deployment, determine one or more recipients of the software package, select one or more operating environments as a function of the software package and the one or more recipients, wherein each operating environment of the one or more operating environments includes a virtual representation of a system associated with each recipient of the one or more recipients, execute the software package within the one or more operating environments, certify the software package for each operating environment of the one or more operating environments based on the execution of the software package and transmit the certified software package to the one or more recipients.

20 Claims, 7 Drawing Sheets

(56) References Cited

U.S. PATENT DOCUMENTS

| | | | | |
|---|---|---|---|---|
| 2012/0317536 | A1* | 12/2012 | Erickson | G06Q 10/0639 717/101 |
| 2018/0113796 | A1* | 4/2018 | Meyers | G06F 11/3684 |
| 2019/0163607 | A1* | 5/2019 | Barbee | G06F 11/3006 |
| 2020/0034133 | A1* | 1/2020 | Dattatri | G06F 8/65 |
| 2020/0050536 | A1* | 2/2020 | Nygaard | G06F 11/3696 |
| 2021/0158625 | A1* | 5/2021 | Rayos | G06V 10/22 |
| 2021/0294944 | A1* | 9/2021 | Nassar | G06F 11/3688 |
| 2022/0284100 | A1* | 9/2022 | Simon | G06F 8/61 |
| 2022/0398121 | A1* | 12/2022 | Loiseau | G06F 8/70 |
| 2023/0086361 | A1* | 3/2023 | Wan | G06F 11/3688 702/186 |
| 2023/0359449 | A1* | 11/2023 | Agrawal | G06F 11/327 |
| 2024/0119140 | A1* | 4/2024 | Crabtree | G06F 8/65 |
| 2024/0211226 | A1* | 6/2024 | Paccapeli | G06F 8/61 |
| 2024/0321123 | A1* | 9/2024 | Vos | G06F 11/0778 |
| 2024/0330170 | A1* | 10/2024 | Mesde | G06F 11/3692 |

OTHER PUBLICATIONS

Saxena et al; Damage Propagation Modeling for Aircraft Engine Run-To-Failure simulation (Year: 2008).*

* cited by examiner

APPARATUS AND METHOD FOR CERTIFICATION OF SOFTWARE WITHIN VIRTUAL INTEGRATION ENVIRONMENTS

FIELD OF THE INVENTION

The present invention generally relates to the field of virtual environment. In particular, the present invention is directed to an apparatus for certification of software within virtual integration environments.

BACKGROUND

The failure of a software in safety critical environments can cause potential human harm. Current systems used to ensure the safety or reliability of a software are limited to few environments and thus only determine the reliability of the software in said environments. Current systems used to ensure the reliability of a software do not properly acknowledge that a software must be monitored in multiple environments to understand the unique relationship between the software and each surrounding environment. In addition, current systems fail to properly certify software to ensure that the software can be integrated into various environments without failure.

SUMMARY OF THE DISCLOSURE

In an aspect an apparatus for certification of software within virtual integration environments is described. The apparatus includes a processor, and a memory communicatively connected the processor. The memory contains instructions configuring the processor to receive a software package for deployment, determine one or more recipients of the software package, select one or more operating environments as a function of the software package and the one or more recipients, wherein each operating environment of the one or more operating environments includes a virtual representation of a system associated with each recipient of the one or more recipients, execute the software package within the one or more operating environments, certify the software package for each operating environment of the one or more operating environments based on the execution of the software package and transmit the certified software package to the one or more recipients.

In another aspect a method for virtual integration environments is described. The method includes receiving, by at least a processor, a software package for deployment, determining, by the at least a processor, one or more recipients of the software package, selecting, by the at least a processor, one or more operating environments as a function of the software package and the one or more recipients, wherein each operating environment of the one or more operating environments includes a virtual representation of a system associated with each recipient of the one or more recipients, executing, by the at least a processor, the software package within the one or more operating environments, certifying, by the at least a processor, the software package for each operating environment of the one or more operating environments based on the execution of the software package and transmitting, by the at least a processor, the certified software package to the one or more recipients.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
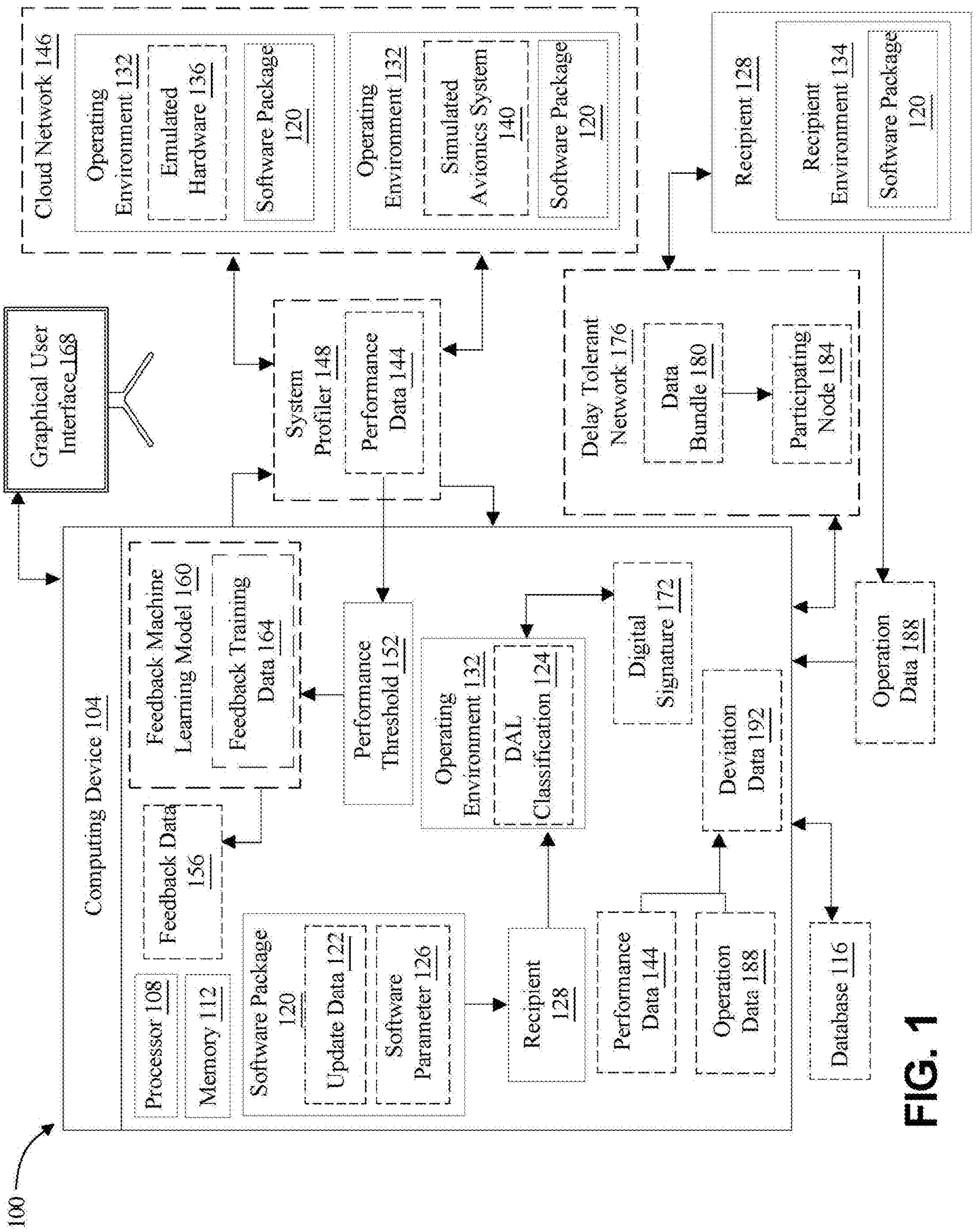
FIG. 1 is a block diagram of an exemplary embodiment of an apparatus for certification of software within virtual integration environments.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for certification of software within virtual integration environments. In an aspect, the present disclosure include a computing device configured to receive a software package, determine operating environments for monitorization and receive performance data from each operating environment.

Aspects of the present disclosure can be used to simulate the use of a software in its intended setting. In an aspect, software may behave differently in different settings. Aspects of this disclosure can be used to determine the differences in which a software reacts in each setting.

Aspects of the present disclosure allow for identification of bugs, errors, and/or other potential issues that can cause a software to malfunction in its intended environment. Exemplary embodiments illustrating aspects of the present disclosure are described below in the context of several specific examples.

A "Virtual integration environment" (VIE) for the purposes of this disclosure is a simulated or virtualized environment where different software and/or hardware components are integrated and tested. VIE allows individuals to test the integration of components and/or to test a software within a particular environment prior to use of the component or deployment of the software. In one or more embodiments, aspects of the present disclosure may allow for the creation and/or selection of virtual integration environments in order to ensure that a system of software has been tested prior to use within their intended environments. In one or more embodiments, systems and/or software may be deployed within virtual integration environments and certified for use following deployment.

In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption". Decryption process may involve the use of a datum, known as a "decryption key", to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamperproofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MVID6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grostl hash function, the HAS-160 hash function, the JH hash function, the RadioGatdn hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. In a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Keys may be generated by random variation in selection of prime numbers, for instance for the purposes of a cryptographic system such as secret that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Cryptographic system may be configured to generate a session-specific secret. Session-specific secret may include a secret, which may be generated according to any process as described above, that uniquely identifies a particular instance of an attested boot and/or loading of software monitor. Session-specific secret may include without limitation a random number. Session-specific secret may be converted to and/or added to a secure proof, verification datum, and/or key according to any process as described above for generation of a secure proof, verification datum, and/or key from a secret or "seed"; session-specific secret, a key produced therewith, verification datum produced therewith, and/or a secure proof produced therewith may be combined with module-specific secret, a key produced therewith, a verification datum produced therewith, and/or a secure proof produced therewith, such that, for instance, a software monitor and/or other signed element of attested boot and/or attested computing may include secure proof both of session-specific secret and of module-specific secret. In an embodiment, session-specific secret may be usable to identify that a given computation has been performed during a particular attested session, just as device-specific secret may be used to demonstrate that a particular computation has been produced by a particular device. This may be used, e.g., where secure computing module and/or any component thereof is stateless, such as where any such element has no memory that may be overwritten and/or corrupted.

Referring now to FIG. 1, an apparatus 100 for certification of software within virtual integration environments is described. Apparatus 100 includes a computing device 104. Apparatus 100 includes a processor 108. Processor 108 may include, without limitation, any processor 108 described in this disclosure. Processor 108 may be included in a and/or consistent with computing device 104. In one or more embodiments, processor 108 may include a multi-core processor. In one or more embodiments, multi-core processor may include multiple processor cores and/or individual processing units. "Processing unit" for the purposes of this disclosure is a device that is capable of executing instructions and performing calculations for a computing device. In one or more embodiments, processing unit be included within a processor, a core of a processor, an FPGA IP core such as picoblaze, and the like. In one or more embodiments, processing units may retrieve instructions from a memory, decode the data, secure functions and transmit the functions back to the memory. In one or more embodiments, processing units may include an arithmetic logic unit (ALU) wherein the ALU is responsible for carrying out arithmetic and logical operations. This may include, addition, subtraction, multiplication, comparing two data, contrasting two data and the like. In one or more embodiment, processing unit may include a control unit wherein the control unit manages execution of instructions such that they are performed in the correct order. In none or more embodiments, processing unit may include registers wherein the registers may be used for temporary storage of data such as inputs fed into the processor and/or outputs executed by the processor. In one or more embodiments, processing unit may include cache memory wherein memory may be retrieved from cache memory for retrieval of data. In one or more embodiments, processing unit may include a clock register wherein the clock register is configured to synchronize the processor with other computing components. In one or more embodiments, processor 108 may include more than one processing units having at least one or more arithmetic and logic units (ALUs) with hardware components that may perform arithmetic and logic operations. Processing units may further include registers to hold operands and results, as well as potentially "reservation station" queues of registers, registers to store interim results in multi-cycle operations, and an instruction unit/control circuit (including e.g. a finite state machine and/or multiplexor) that reads op codes from program instruction register banks and/or receives those op codes and enables registers/arithmetic and logic operators to read/output values. In one or more embodiments, processing unit may include a floating-point unit (FPU) wherein the FPU is configured to handle arithmetic operations with floating point numbers. In one or more embodiments, processor 108 may include a plurality of processing units wherein each processing unit may be configured for a particular task and/or function. In one or more embodiments, each core within multi-core processor may function independently. In one or more embodiments, each core within multi-core processor may perform functions in parallel with other cores. In one or more embodiments, multi-core processor may allow for a dedicated core for each program and/or software running on a computing system. In one or more embodiments, multiple cores may be used for a singular function and/or multiple functions. In one or more embodiments, multi-core processor may allow for a computing system to perform differing functions in parallel. In one or more embodiments, processor 108 may include a plurality of multi-core processors. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, apparatus 100 includes a memory 112 communicatively connected to processor 108, wherein the memory 112 contains instructions configuring processor 108 to perform any processing steps as described herein. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 112 may include a primary memory and a secondary memory. "Primary memory" also known as "random access memory" (RAM) for the purposes of this disclosure is a short-term storage device in which information is processed. In one or more embodiments, during use of computing device 104, instructions and/or information may be transmitted to primary memory wherein information may be processed. In one or more embodiments, information may only be populated within primary memory while a particular software is running. In one or more embodiments, information within primary memory is wiped and/or removed after computing device 104 has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor.

In one or more embodiments, data is transferred from secondary to primary memory wherein processor 108 may access the information from primary memory.

Still referring to FIG. 1, Apparatus 100 may include a database 116. Database may include a remote database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, computing device 104 may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by system computing device 104. In one or more embodiments, computing device 104 may transmit processes to server wherein computing device 104 may conserve power or energy.

With continued reference to FIG. 1, apparatus 100 may include a host circuit. Host circuit includes at least a processor 108 communicatively connected to a memory 112. As used in this disclosure, a "host circuit" is an integrated circuit or a collection of interconnected circuits designed to manage, control, and/or interface with one or more functionalities in a system. In a non-limiting example, host circuit may be configured as a primary platform or base that provides essential infrastructure, resources, and interfaces to facilitate the operation of other connected or integrated components. Hosting circuit may include any computing device as described in this disclosure, including without limitation a microcontroller, microprocessor, digital signal processor (DSP) and/or system on a chip (SoC) that provide one or more services, resources, or data to other computing devices. Host circuit may include, be included in, and/or communicate with a mobile device such as a mobile telephone or smartphone. Host circuit may include a single computing device operating independently, or may include two or more computing device operating in concert, in parallel, sequentially or the like; two or more computing devices may be included together in a single computing device or in two or more computing devices. In some cases, Host circuit may include but is not limited to, for example, a computing device or cluster of computing devices in a first location and a second computing device or cluster of computing devices in a second location. In other cases, host circuit may include a main unit or a primary circuit in a network that controls communications and/or provide a central point of interface. In one or more embodiments, host circuit may be used in lieu of computing device 104. In one or mor embodiments, host circuit may carry out one or more processes as described in this disclosure intended for computing device 104.

With continued reference to FIG. 1, in or more embodiments, apparatus 100 may implement one or more aspects of Future Airborne Computing Environment (FACE). As used in this disclosure, a "Future Airborne Computing Environment" is a technical standard and business strategy for promoting acquisition of open systems software architecture in aviation industry, specifically for military avionics system. In some cases, apparatus 100 may employ FACE approach, wherein a computing device may run in a common operating environment to support one or more portable capability software applications across a plurality of department of defense (DoD) avionics systems. In some cases, FACE may include a plurality of software application programming interfaces (APIs) grouped into "segments." In a non-limiting example, FACE may include operating system segments (OSS), platform specific services segment (PSSS), I/O service segment, transport services segment, and/or the like. In some cases, FACE may provide a bounding box around software items and APIs, i.e., FACE Boundary. In some cases, apparatus 100 may include one or more extensions to FACE that satisfy safety assumptions in hardware outside FACE Boundary. In a non-limiting example, FACE may include a plurality of API groups (i.e., segments), wherein one or more API groups may be dependencies for avionics functional software (i.e., portable component segment [PCS]) to be deployed to FACE. In some cases, such avionics functional software may not need any dependencies. Additionally, or alternatively, FACE may also anticipate one or more hardware resources which software (i.e., portable component segment deployed within the FACE Boundary) may or may not require to satisfy their hardware assumptions and/or dependencies. In a non-limiting example, FACE may include a health monitoring monitor, interface hardware such as Ethernet device driver (within operating system segment) configured to infer specific hardware assumptions.

With continued reference to FIG. 1, processor 108 is configured to receive a software package 120 for deployment. "Software package" for the purposes of this disclosure is any executable application or any file containing an executable application. For example, and without limitation software package 120 may include a document drafting software, an image viewing software and the like. In one or more embodiments, software package 120 may include a standalone software such as a simple executable file. In one or more embodiments, software package 120 may include containers, software images and the like. A "software image," also known as a "container image," as described herein, is a snapshot or a packaged representation of an entire software state, including executable code, configurations, dependencies/libraries, and other required data. In some cases, software image may include source code, libraries, and other software components that the software relies on. In some cases, software image may include one or more configuration files which define a plurality of settings, parameters, and other configurations for the software. In some cases, configuration files may include certain OS configurations, environmental variables, or other system-level settings. In a non-limiting example software image may include a portable executable image combined with a manifest file that is used by a container manager as described below to deploy the software image in a virtual environment with appropriate data services and restrictions. In some cases, software image may be used to package a software application with its entire collection of dependencies, ensuring that the software application can run consistently across different SOEs. Exemplary software applications may include, without limitation, flight management system (FMS) software, air traffic control (ATC) software, avionics software, electronic flight bag (EFB) software, ground support equipment software, weather forecasting and reporting software, cockpit display rendering software, and/or the like. In some cases, software image may include a virtual machine image that encapsulate a whole operating system along with one or more pre-installed software applications. Such software may be easily replicated across a plurality of host circuits e.g., servers or cloud environment. In other cases, software image may be used as a backup snapshot to restore/roll back system or a software application to a known working state.

With continued reference to FIG. 1, software package 120 may include a software module. A "software module" for the purposes of this disclosure, is an application or software that is sought to be executed. For example, and without limitation, software module may include a web browser, word processing software, a media player, a digital calculator, flight systems software, military software and the like. In one or more embodiments, software module may include an application that is sought to be executed within software container. In one or more embodiments, any data and/or information within software container may be used to ensure proper execution of software module. In one or more embodiments, software container may contain libraries, dependencies, and the like to ensure proper execution of software module. In one or more embodiments, software module may include an executable file. In one or more embodiments, software module may include third party application wherein 3rd party applications may include software and/or application created and/or managed by a differing entity. In one or more embodiments, software module may include previously developed applications wherein the previously developed application are modified to interact with a particular environment. In one or more embodiments, software container may allow for a third-party application and/or previously developed application to be deployed within multiple virtual environments and/or operating system. In one or more embodiments, software module may include a previously developed application and/or 3rd party application wherein software module may be placed within software container to allow for software module to operate within multiple environments. A "software container" for the purposes of this disclosure is an executable package that is capable of running software within an isolated space. For example, and without limitation, software container may include a document drafting software wherein the software container may contain any information, runtime environment and the like necessary to execute the document drafting software on more than one operating systems. In one or more embodiments, software containers may create a virtualized environment wherein a software may run within the virtualized environment. In one or more embodiments, virtual environment may include a virtualized environment. A "virtualized environment," for the purposes of this disclosure is a system in which software may be isolated while still operating on a host operating system. For example, and without limitation, software container may operate in a virtualized environment wherein a software within software container may not communicate with the host operating system. In one or more embodiments, software container may allow for OS virtualization wherein a software may be isolated from a host operating system while still sharing the host operating system kernel. An "operating system (OS) level virtualization," for the purposes of this discourse is a system in which an operating system kernel allows the existence of multiple isolated environment. In OS virtualization, a software within software container may not have access to resources of the host operating system. Instead, the software may only have access to the contents within software container. In one or more embodiments, virtual environment may include a host operating system. A "host operating system" for the purposes of this disclosure is a primary operating system running on processor 108. In one or more embodiments, software container may be executed atop host operating system. In one or more embodiments, virtual operating systems may exist atop host operating system. In one or more embodiments, host operating system may include an operating system configured to allow instantiation of one or more software containers, one or more virtual machines and the like. In one or more embodiments, software container may communicate with host operating system to receive resources from processor 108 and/or memory. In one or more embodiments, an ordinary software operating outside of a software container may have access to various operating system resources such as but not limited to, processing capabilities, file systems, networks and the like. In contrast, a software operating within a software container may only have access to the contents within the software container. This may include various files, network capabilities and the like. In one or more embodiments, a software within software container may communicate with software container wherein software container may transmit the commands to the processor 108. In one or more embodiments, software container may contain application-level virtualization. "Application-level virtualization" for the purposes of this disclosure is a system in which a software may be completely encapsulated from a host operating system such that the software may not share the host operating system kernel. In one or more embodiments, in application-level virtualization an application may be encapsulated within a virtual environment as described in further detail below. In one or more embodiments, in application-level virtualization an application may communicate through a virtualization layer such as one created by a hypervisor. In one or more embodiments, application virtualization may include a process in which the application does not rely on the host operating system kernel. In one or more embodiments, software container may contain OS level virtualization wherein a software within software container may be executed in a virtualized environment. In one or more embodiments, software container may contain application virtualization wherein a software may be executed on multiple differing operating system. In one or more embodiments, in an OS level virtualization, a software may be dependent on the host operating system kernel wherein in an application virtualization, the software may run independent of the host operating system kernel. In one or more embodiments, software container may isolate an application from a surrounding environment wherein the software may operate in a runtime environment. In one or more embodiments, the runtime environment includes everything necessary to allow for isolation of a software from the host operating system. This may include but is not limited to, application and/or software code, dependencies, runtime components needed to execute the application such as access to a database 116, and the like. In one or more embodiments, a software within software container may operate in a runtime environment wherein the software may be isolated from the host operating system. In one or more embodiments, software container may allow for an application to be executed and/or deployed on multiple operating systems. In one or more embodiments, software container may contain libraries, configuration files, binary code and/or any other information that is necessary to execute the application and/or software. In one or more embodiments, a software container may contain some degree of independence from the operating system and/or host system wherein the software container does not rely on the operating system for any information needed to properly deploy an application within software container. In one or more embodiments, operating systems may lack the proper functionalities to execute an application, wherein software container may be used to ensure that any necessary functionalities, information, and the like are self-contained. In one or more embodiments, software container may contain a container image, wherein the container image is a portable executable image combined with a manifest that is used by a container manager to deploy the container image on a virtual environment with appropriate data services and restrictions. In one or more embodiments, software container may contain restrictions and/or instructions on how a software may communicate with the operating system in which it is deployed on. In one or more embodiments, software container may contain a container manager, wherein the container manager has the ability to deploy container images on the operating system. The container manager may interface with container image repositories, validate the authenticity of container images, load container executables into container environments, connect container environments to operating service, and exports management application user interfaces (API) to system management tools. In one or more embodiments, software container may include any software container as described in U.S. Nonprovisional application Ser. No. 18/395,210 filed on Dec. 12, 2023 having "SYSTEM AND METHOD FOR A SAFETY CRITICAL OPERATING ENVIRONMENT CONTAINER ARCHITECTURE", and U.S. Nonprovisional application Ser. No. 18/443,570 filed on Feb. 16, 2024 having "SYSTEM AND METHODS FOR PROVIDING INTEROPERABLE NETWORKS AND COMMUNICATIONS", the entirety of which are incorporated herein by reference.

With continued reference to FIG. 1, software package 120 may include a software container, a container image, and the like. In one or more embodiments, software package 120 may further include modification to an already existing executable file and/or container. In one or more embodiments, software package 120 may include modification or updates to an already existing software or system. In one or more embodiments, software package 120 may include updates used to modify, enhance, correct, or otherwise alter an operation, functionality, feature, or performance of an existing computer software computer application, firmware, or hardware component within a designated virtual environment. For example, and without limitation, software package 120 may include an instruction or a set of instructions to add additional code to a software, to add additional features to a software, instructions to remove a software bug and the like. In one or more embodiments, software package 120 may include information such as but not limited to, additional software capabilities, additional system requirements, changes to one or more processes within a system, changes to the visual design of a system, changes to the user interface of a system and the like. In one or more embodiments, software package 120 may be used to correct instructions and/or code on a software, to modify the capability of a software and the like. In one or more embodiments, software package 120 may include information associated with the software that is to be modified. This may include but is not limited to, the name of the software, compatibility information, system requirements, the date in which software package 120 was generated for the software, the version number of software package 120, information indicating potential changes to the software, information indicating additions to the software and the like. In one or more embodiments software package 120 may include modifications to a weapons system 120 such as but not limited to, guided missile systems, smart bombs, automated defense systems, unmanned aerial vehicles, threat identification systems, artificial intelligent algorithms, weapons, operational flight programs and the like. In one or more embodiments, software package 120 may include modifications to an operating system, modifications to an operating system used for aviation, modifications to an aviation system, modifications to aircraft systems and the like.

With continued reference to FIG. 1, software package 120 may include update data 122 configured to modify an existing system or software. "Update data" for the purposes of this disclosure is information used to modify, enhance, correct, or otherwise alter an operation, functionality, feature, or performance of an existing computer software computer application, firmware, or hardware component within a designated operating environment. For example, and without limitation, update data 122 may include an instruction or a set of instructions to add additional code to a software, to add additional features to a software, instructions to remove a software bug and the like. In one or more embodiments, update data 122 may include information such as but not limited to, additional software capabilities, additional system requirements, changes to one or more processes within a system, changes to the visual design of a system, changes to the user interface of a system and the like. In one or more embodiments, update data 122 may be used to correct instructions and/or code on a software, to modify the capability of a software and the like. In one or more embodiments, update data 122 may include information associated with the software that is to be modified. This may include but is not limited to, the name of the software, compatibility information, system requirements, the date in which update data 122 was generated for the software, the version number of update data 122, information indicating potential changes to the software, information indicating additions to the software and the like. In one or more embodiments software package may include modifications to a weapons system such as but not limited to, guided missile systems, smart bombs, automated defense systems, unmanned aerial vehicles, threat identification systems, artificial intelligent algorithms, weapons, operational flight programs and the like. In one or more embodiments, update data 122 may include modifications to an operating system, modifications to an operating system used for aviation, modifications to an aviation system, modifications to aircraft systems and the like. In one or more embodiments update data 122 may include patches to a system or software. A "patch" for the purposes of this disclosure is a set of instructions or code designed to fix specific issues or to improve issues within an existing system. In one or more embodiments, patches may include instructions to modify a code with a faulty system, instructions to make one or more processes more efficient, modifications to security vulnerabilities within a system, modifications to faulty code and the like. In one or more embodiments, patches may be used to address existing issues within a system in order to repair the existing issues. In one or more embodiments, update data may include any modifications and/or updates to any virtual environments, operating environments, software containers, virtual machines, emulated hardware, and the like as described in this disclosure. In one or more embodiments, software package may include software package as described as described in U.S. Nonprovisional application Ser. No. 18/443,657 filed on Feb. 16, 2024, and entitled "APPARATUS AND METHOD FOR MODIFICATION OF OPERATING ENVIRONMENTS", the entirety of which is incorporated herein by reference. In one or more embodiments software package 120 may include patches to a system or software. A "patch" for the purposes of this disclosure is a set of instructions or code designed to fix specific issues or to improve issues within an existing system. In one or more embodiments, patches may include instructions to modify a code with a faulty system, instructions to make one or more processes more efficient, modifications to security vulnerabilities within a system, modifications to faulty code and the like. In one or more embodiments, patches may be used to address existing issues within a system in order to repair the existing issues.

With continued reference to FIG. 1, software package 120 may include a design level classification. A "design assurance level classification," for the purposes of this disclosure in a labeling of software based on the effects caused by a failure of the software. For example, and without limitation, a software failure associated with a first software which can potentially put human lives at risk may receive a particular classification whereas a software failure associated with a second software which may, at most, slightly injure an individual may be given a differing classification. In one or more embodiments, each software may be associated with a particular DAL. DAL classification 124 may range from A-E wherein a DAL-A classification may indicate the software may cause death during failure, whereas as a DAL-E classification may indicate that there is no potential harm in the event of a software failure. In one or more embodiments, various software may be given classifications based on their inherent risk to cause harm to individuals. In one or more embodiments, the DAL of a software and/or software package 120 may indicate that one software may require more testing, safety protocols and the like in comparison to other software. For example, a DAL-E classified software may not require much testing as failure may not harm individuals, whereas a DAL-A may require stringent testing to ensure that failure does not occur. In one or more embodiments, each DAL certification may contain minimum resource requirements such as minimum processing power, minimum space allocation, and the like. In one or more embodiments, a software container and/or software package 120 may contain software associated with aviation and/or military technology, wherein each software container may contain DAL classification 124. For example, and without limitation, a software container may include software such as engine control systems, inflight entertainment, missile guidance systems, fuel monitoring systems and the like.

With continued reference to FIG. 1, software package may include software parameters 126. A "Software parameter" for the purposes of this disclosure refers to the configuration settings of software package. For example, and without limitation, software parameters 126 may include the particular network that software package 120 may be using and/or is configured to use, the processing power needed for use of software package, the operating system required for software package, the hardware needed for proper use of software package and the like. In an embodiment, software parameters 126 may include the requirements needed for software package to be used within a particular environments. For example, and without limitation software parameters 126 may indicate a particular operating system, a particular network and the like which may be needed for proper use of software package 120. In one or more embodiments, software parameters 126 may include database types, hostnames or IP addresses of the database server, various security settings, log file locations, processing requirements, memory requirements, storage requirements, network requirements and the like. In one or more embodiments, software parameters 126 may indicate the particular hardware and/or software components needed for proper use of software package 120. In one or more embodiments, software parameters 126 may differ between similar software packages 120. For example, and without limitation, software packages 120 that are configured to perform the same or similar functions may contain differing software parameters 126 in instances in which the software parameters 126 are configured for differing environments. In one or more embodiments, software parameters 126 may differ for each operating environment 132 (as described in further detail below) wherein each software package 120 may contain software parameters 126 that are configured for the particular operating environment 132. In one or more embodiments, operating environments 132 may contain differing hardware, software, network and the like wherein software parameters 126 within software package 120 may differ for each operating environment 132 such that software package 120 may be suited for each operating environment 132. In one or more embodiments, a user may create differing software parameters 126 for each operating environment 132 wherein software package 120 may be configured for each operating environment 132. In one or more embodiments, software parameters 126 may be received by recipients 128 (as described in further detail below). In one or more embodiments, software parameters 126 may be associated with each recipient wherein selection of a particular recipient may indicate the use of a particular set of software parameters 126. In one or more embodiments software parameters 126 may include software configuration parameters as described in this disclosure. In one or more embodiments, software package 120 may contain software parameters 126 wherein software parameters may differ for each recipient 128 and/or operating environment 132.

With continued reference to FIG. 1, in one or more embodiments processor 108 is configured to determine one or more recipients 128 of software package 120. A "recipient" for the purposes of this disclosure is an intended receiver of software package. For example, and without limitation, recipients may include individuals' and/or systems associated with individuals that will receive and/or are anticipated to receive software package 120. In one or more embodiments, recipients 128 may include individuals within a particular entity or government agency, computing systems, aircraft entities, various groups within a government agency and the like. In one or more embodiments, recipient 128 may include specific individuals and/or broad categorizations. For example, and without limitation, broad categorizations may include any aircraft system, any military system, any weapons system and the like. In one or more embodiments, recipients 128 may include computing systems and/or devices that are remote to processor 108. In one or more embodiments, processor 108 may be configured to determine one or more recipients 128 based on software package 120 wherein software package 120 may indicate the intended recipients 128 of software package 120. In one or more embodiments, software package 120 may include system requirements and/or other information that may indicate the intended recipients 128 of software package 120. In one or more embodiments, recipients 128 may be determined based on DAL classification 124 wherein each grouping of recipients 128 may be associated with a DAL classification 124. For example, and without limitation, a software package 120 with a DAL-A classification may be intended for systems configured for DAL-A classified software. In one or more embodiments, recipients 128 may be retrieved from a list located on database 116. In one or more embodiments, recipients 128 may be categorized wherein determining recipients 128 may include determining one or more categorizations, such as but not limited to, weapons systems categorizations, avionics categorizations, weapons categorizations and the like. In one or more embodiments, recipients 128 may be determined based on user input. "User input" for the purposes of this disclosure is information received by computing device 104 from an individual associated with apparatus 100. For example, and without limitation, user input may include information received by an operator of apparatus 100, a software engineer and the like. In one or more embodiments, user input may include the names or categorization of recipients 128 that are determined to receive software package 120. In one or more embodiments, recipients 128 may be based on requirements given by software package 120 such as but not limited to, storage requirements, operating system requirements, processing requirements and the like. In one or more embodiments, recipients 128 may include any computing system in which software package 120 may be reasonably anticipated to be executed on. In one or more embodiments, recipients 128 may include a system, individual and/or entity requesting software package 120. In one or more embodiments, recipients 128 may include software requesting an update, modifications and the like. In one or more embodiments, recipients may request software package may submitting a request to a central server and/or database.

With continued reference to FIG. 1, in one or more embodiments, processor 108 is configured to select one or more operating environments 132 as a function of software package 120 and one or more recipients 128. An "operating environment" for the purposes of this disclosure refers to the combination of hardware and software that allows a computer software to function or execute. For example, and without limitation, operating environment 132 may include an operating system, device drivers, virtual machines, software containers, software modules, executable programs, software packages 120, and the like. In one or more embodiments, operating environment 132 may allow for the execution of computer software such as software package 120. In one or more embodiments, operating environments 132 may allow for the execution of software modules and/or software containers. In one or more embodiments, operating environment 132 may include an operating system. In one or more embodiments, operating environment 132 may include an operating system differing from that of a host operating system utilized by computing device 104. In one or more embodiments, operating environment 132 may include an operating system separate and distinct from an operating system on computing device 104. In one or more embodiments, operating environment 132 may include a virtual environment. A "virtual environment" for the purposes of this disclosure is a self-contained environment within a computing device 104 that allows for the isolation of one or more software from the host operating system. For example, and without limitation, a virtual environment may include a separate and isolated operating system on computing device 104 that does not interact with the host operating system. In one or more embodiments, virtual environment may include an environment located on a virtual machine. Host operating system may a primary operating system installed on a computing device 104 hardware. In some cases, host operating system may manage underlaying physical resources and facilitate the running of one or more guest operating systems (guest OS). In a non-limiting example, Linux operating system running on computing device 104 as the primary operating system may be the host operating system. Software applications integrated to computing device 104 as described herein may be run atop host operating system. In some cases, virtual environment may be software-defined, for example, and without limitation, virtual environment may include a simulated operating system that operates independently of the underlaying physical hardware of computing device 104. In some cases, virtual environment may emulate one or more hardware, software, networks, or a combination thereof. In a non-limiting example, a plurality of partitions may be allocated inside of virtual environment, wherein each partition may include a virtual machine (VM). "Virtual machine," for the purpose of this disclosure, is a software-based emulation of a computer system that is capable of running one or more software applications as if they were running on physical hardware. For instance, and without limitation, virtual environment may include a separate and isolated operating system on computing device 104 that does not interact with host operating system.

In one or more embodiments, a virtual machine may be used to select and execute an operating system that is separate and isolated from the host operating system. In one or more embodiments, virtual machine may allow for the creation of virtual environments. In one or more embodiments, generation of a virtual environment may include allocation of memory space on memory on computing device 104. "Memory allocation" for the purposes of this disclosure is the process of reserving computer space for a particular purpose. In one or more embodiments, memory may be allocated for generation of a virtual environment. In one or more embodiments, memory allocation may be static wherein a predefined amount of space if reserved and cannot be modified. For example, and without limitation, in a static memory allocation, if a virtual environment is given 2 gigabytes of memory, the memory cannot be increased or decreased. In one or more embodiments, memory allocation may be dynamic wherein memory may be continuously increased based on the demands of the virtual environment. In one or more embodiments, memory may be allocated in order to ensure that a virtual environment contains the proper amount of space in order to perform its intended functions. In one or more embodiments, creation of a virtual environment may include creation of a guest operating system using virtual machine.

In one or more embodiments, memory allocation may include a process of reserving memory space on the host operating system for use within the virtual environment. In one or more embodiments, memory allocation may further include partitioning of memory wherein the memory may be portioned into more than one parts. In one or more embodiments, memory may be partitioned into a root partition (also known as a parent partition) and one or more child partitions. The root partition may contain the operating system while the child partitioning contain the virtual environments.

In one or more embodiments, management of the child partitions may be done through the root partition. In one or more embodiments, computing device 104 may be configured to partition memory into more than one or child partitions wherein each child partition may be associated with a separate software container. "Partition" for the purposes of this disclosure refers to a separated section of physical hardware on computing device 104. For example, and without limitation, a memory may be split into several partitions wherein each partition may be used for separate and distinct storage tasks. In one or more embodiments, one or more various physical hardware components may be partitioned such as but not limited to a processor 108, a primary memory, a secondary memory, a network device, and the like. In one or more embodiments, partitioning may include the use of disk management software and/or other partitioning software that may allow for the splitting of a physical hardware component into one or more separate partitions.

With continued reference to FIG. 1, virtual environment may be created on host operating system. In one or more embodiments, in instances where virtual environment is generated on a host operating system, the virtual environment must communicate with the host operating system to receive resources such as computing power, memory space and the like. In one or more embodiments, one or more virtual environments may be generated using a hypervisor. A "hypervisor" for the purposes of this disclosure is a software module which is configured to create and manage virtual machines. In one or more embodiments, hypervisor may create one or more virtual machines wherein each virtual machine may host a sperate and isolated virtual environment. In one or more embodiments, each virtual environment may contain a separate and isolated operating system. In one or more embodiments, a hypervisor may run on the host operating system wherein the hypervisor may generate virtual machines on the host operating system. In one or more embodiments, a hypervisor may run directly on the hardware of a computing device 104 without reliance on an operating system. In one or more embodiments, a hypervisor that runs independent of a host operating system may be referred to as a "Type 1" and/or "bare metal" hypervisor. In one or more embodiments, in a bare metal hypervisor, the hypervisor is directly installed on the hardware of computing device 104 rather than through the operating system. In one or more embodiments, a type 1 hypervisor may partition resources, such as memory processing power and the like for each virtual machine. In one or more embodiments, virtual machines may communicate directly with the hardware of computing device 104 rather than the host operating system. In one or more embodiments, in a bare metal hypervisor virtual machines are not susceptible to issues caused by the host operating system and/or other virtual machines. In one or more embodiments, virtual machines may be isolated and unaware that other virtual machines exist. In one or more embodiments, a bare metal hypervisor may allow for increased performance wherein virtual machines may communicate directly with hardware rather than through the intermediate host operating system. In one or more embodiments, a bare metal hypervisor may allow multiple virtual machines to run simulates wherein failure of one virtual machine may not result in a failure of a second virtual machine. In one or more embodiments, in a type 2 hypervisor, partitioning and resource allocation may occur above the host operating system layer, whereas in a type 1 hypervisor partitioning may occur below the host operating system and directly with the hardware of computing device 104.

In one or more embodiments, in a type 2 hypervisor, virtual environments may rely on the host operating system for proper resource allocation and memory allocation whereas in a type 1 hypervisor, virtual environments may only rely on the hardware.

In one or more embodiments, hypervisor may include a software configured as a virtual machine monitor (virtual machines). In some cases, hypervisor may be configured to allow a physical machine (host) such as computing device 104 to run a plurality of operating systems simultaneously by virtualizing system hardware e.g., processor 108*s*, memory, I/O devices, and/or the like. In a non-limiting example, hypervisor may create one or more virtual machines wherein each virtual machine may host a sperate and isolated operating environment 132. In some cases, hypervisor may run directly on the hardware of computing device 104 without reliance of an operating system. Instantiating hypervisor may include launching or initializing hypervisor in host operating system. In some cases, instantiation of hypervisor may create virtual environment and/or operating environment 132 wherein a plurality of partitions (i.e., virtual machines) can be run and managed. In an embodiment, hypervisor may include a "type 1 hypervisor" that may run independently of host operating environment 132. In a non-limiting example, hypervisor may include a bare metal hypervisor that runs directly on the computing device 104 hardware and manages one or more quest operating systems. Exemplary type 1 hypervisor may include, without limitation, MICROSOFT HYPER-V, VMWARE ESXI, XEN, and/or the like. In some cases, virtual machines created by type 1 hypervisor may communicate directly with the hardware of computing device 104 rather than host operating system. In some cases, virtual machines created by type 1 hypervisor may not be susceptible to issues caused by the host operating system and/or other virtual machines in virtual environment. In a non-limiting example, one or more virtual machines may be isolated and unaware of existence of other virtual machines. In an embodiment, type 1 hypervisor may allow for an increased performance wherein virtual machines within virtual environment may communicate directly with hardware rather than through the intermediate host operating system. In a non-limiting example, type 1 hypervisor may allow one or more virtual machines to run simultaneously, wherein the failure of a first virtual machines may not result in a failure of a second virtual machines.

With continued reference to FIG. 1, in another embodiment, hypervisor may include a "type 2 hypervisor" that runs atop host operating system similar to any other software applications. In one or more embodiment, hypervisor may include a hosted hypervisor having resource allocation occurred right above host operating system. In some cases, type 2 hypervisor may rely on host operating system of computing device 104, whereas in type 1 hypervisor as described above, may only rely on the hardware of computing device 104. Exemplary type 2 hypervisor may include, without limitation, VMWARE WORKSTATION, ORACLE VIRTUAL BOX, and/or the like. In some cases, when instantiating type 2 hypervisor, processor 108 may launch type 2 hypervisor that has been pre-installed similar to launching any software application. Once host OS is up and running, processor 108 may then start type 2 hypervisor to create, manage and run virtual machines atop the host OS; however, for type 1 hypervisor, since it runs directly on "bare metal" (i.e., hardware without requiring an underlying operating system), instantiating type 1 hypervisor may involve booting the system from a medium such as, without limitation, a USB drive, CD, or a network source containing hypervisor. Once booted, hypervisor may take control of at least a portion of hardware resources and manage and/or launch one or more virtual machines.

With continued reference to FIG. 1, processor 108 may then generate a virtualization layer supervised by hypervisor, wherein a host operating system within virtual environment is operated by the virtualization layer. As used in this disclosure, a "virtualization layer" is a software layer (or interface) that sits between hardware layer (e.g., physical CPU, memory, I/O devices, and/or the like) and virtual environment having one or more virtual machines. In some cases, virtualization layer may be configured to virtualize the underlaying hardware resources and present the virtualized hardware resources to plurality of virtual machines as though they are dedicated to each virtual machine. In a non-limiting example, a plurality of partitions of a single physical hardware component as described herein may share the same physical hardware resources through virtualization layer, without being aware of each other. In some cases, virtualization layer may be instantiated when hypervisor is booted or launched. In a non-limiting example, in case of a type 1 hypervisor, virtualization layer may be generated when machine starts up since hypervisor directly interface with hardware. In another non-limiting example, in case of a type 2 hypervisor, virtualization layer may be established once hypervisor software is initiated on top of host OS. In some cases, hypervisor may be configured to monitor and manage one or more hardware abstraction and allocate these virtualized resources to designated virtual machines. In a non-limiting example, virtualized resources may include CPU time, memory space, I/O operations and/or the like. In some cases, virtualized resources may be allocated based on partition policy as described in detail below. In some cases, hypervisor may manage the scheduling of virtual machines tasks on actual cores. In some cases, hypervisor may handle interruptions, exceptions, and any events that occur, deciding which virtual machines or service needs attention. In some cases, hypervisor may be configured to isolate one or more virtual machines from rest of virtual machines to maintain system security and stability. In other cases, hypervisor may be configured to manage lifecycle operations of one or more virtual machines such as, without limitation, creation, modification, deletion, migration, and/or the like.

With continued reference to FIG. 1, in one or more embodiments, one or more physical hardware components of computing device 104 may be partitioned. In one or more embodiments, one partition of the plurality of partition may contain host operating system. In one or more embodiments, host operating system may be used to manage hypervisor, instantiate virtual machines and the like. In one or more embodiments, host operating system may operate on primary partition and/or a parent partition wherein virtual machines may operate on child partitions. In one or more embodiments, management of hypervisor may occur on host operating system. In one or more embodiments, one or more processes as described herein may occur on host operating system prior to being implemented within child partitions.

With continued reference to FIG. 1, in a non-limiting example, when host operating system 132 is created, a pre-defined set of virtual hardware resources may be provided by virtualization layer, wherein the pre-defined set of virtual hardware resources may include, but is not limited to processor 108 cores, portion of virtualized memory, virtual disks, virtual network interfaces, among others. As host operating system attempts to execute one or more operations or access its "hardware," host operating system may interface with virtualization layer, for instance, and without limitation, when virtual machine tries to use processor 108, it may be scheduled by hypervisor onto physical processor 108 on computing device 104 through virtualization layer. In some cases, host operating system may receive these resources as if they are dedicated hardware components, oblivious to the abstraction layer beneath. In some cases, virtualization layer may handle I/O operations, translating virtual disk or network accesses to actual operations on the physical hardware. Any interruption, exception, or system call made by host operating system 132 may be intercepted by virtualization layer which then communicates with hypervisor to handle or service that request.

With continued reference to FIG. 1, operating environment 132 may be configured for execution of software package 120 wherein software package 120 may be instantiated within operating environment 132. In one or more embodiments, operating environment 132 may include virtual environment as described above. In one or more embodiments, operating environments 132 may be configured to simulate performance of software package 120 similar to that of virtual environments associated with recipients 128. In one or more embodiments, operating environment 132 may include a virtual representation of an operating environment associated with recipient. In one or more embodiments, operating environment may include a virtual representation of a system associated with recipient, wherein the system may include physical hardware, operating environments 132, software containers and the like. In one or more embodiments, a system associated with a recipient may be referred to as a "recipient environment." In one or more embodiments, recipient environment 134 may include a software, an operating environment, a virtual environment, a physical system, a digital system, and the like associated with recipient. For example, and without limitation, recipient 128 may include an aircraft operator wherein recipient environment 134 may include an avionics and/or flight system. In one or more embodiments, recipients may contain their own distinct systems wherein the systems may include physical hardware, software, operating systems, virtual machines, virtual environments, computing devices, remote devices, and the like. In one or more embodiments, operating environment may include a virtual representation of a system associated with recipient 128 and/or recipient environment 134 wherein operating environment may include a virtual representation of a physical hardware, software and the like. In one or more embodiments, each operating environment may include a virtual representation of a system for each recipient. In one or more embodiments, at least one operating environment 132 may include emulated hardware 136. "Emulated hardware" for the purposes of this disclosure refers to virtual representations of physical computing components. For example, and without limitation, emulated hardware 136 may include a virtual representation of a processor 108, memory, BUS and the like. In one or more embodiments, emulated hardware 136 may be used to emulate physical computing systems. In one or more embodiments, emulated hardware 136 may allow for an individual to determine how a system may act with the use of a particular hardware. In one or more embodiments, operating environment 132 may include emulated hardware 136 wherein operating environment 132 may be used to simulate computing systems on aircraft, computing systems on military equipment and the like. In one or more embodiments, emulated hardware 136 may include physical components typically used within aircraft systems, within flight systems, within weapons systems and the like.

In one or more embodiments, operating environment 132 may be used to simulate execution of software package 120 within differing computing systems and/or environments through the use of emulated hardware 136. In one or more embodiments, at least one operating environment 132 may include a simulated avionics system 140. A "simulated avionics system" for the purposes of this disclosure refers to a virtual representation of an aircraft system. In one or more embodiments, simulated avionics system 140 may include a simulation of software, operating systems, and the like present on an aircraft. In one or more embodiments, simulated avionics system 140 may include software typically located on an aircraft system such as but not limited to, navigation systems, communications systems, flight instruments and the like. In one or more embodiments, simulated avionics system 140 may be used to simulate the effect of software package 120 on an aircraft system. In one or more embodiments, simulated avionics system 140 may allow a user to simulate flight simulation while software package 120 has been executed.

With continued reference to FIG. 1, at least one operating environment 132 may include a digital twin associated with at least one recipient 128. In one or more embodiments, operating environment 132 may include a digital twin of at least one recipient environment 134. A "digital twin" for the purposes of this disclosure is a virtual representation of a real world object or system. For example, and without limitation, digital twin may include a virtual representation of a military system, a weapons system and the like. In one or more embodiments, operating environment 132 may include digital twins. In one or more embodiments, digital twin may include a software, operating system and the like of a particular computing system that is anticipated to receive software package 120. In one or more embodiments, digital twin may include a virtual representation of physical hardware, a virtual representation of a physical system and the like. In one or more embodiments, digital twin may be used to simulate execution of software package 120 on one or more computing systems in order to determine potential issues, performance statistics and the like that may be used to determine the performance of software package 120 on one or more computing systems. In one or more embodiments, digital twins may be associated with recipients 128 wherein digital twin may include simulated environments similar to that of recipients 128. For example, and without limitation, in instances in which recipients 128 may include military systems, digital twin may include an operating environment 132 similar to that of military system. In one or more embodiments, digital twin may be used to determine the performance or reliability of software package 120 prior to transmission to recipient 128. In one or more embodiments, software package 120 may be executed on a system similar to that of recipients 128 in order to determine the performance of software package 120. In one or more embodiments, different recipients 128 may contain differing operating systems, differing hardware, differing systems and the like wherein each operating environment 132 may be used to generate differing digital twins. In one or more embodiments, each operating environment 132 may include digital twin of at least one recipient 128. In one or more embodiments, digital twin may include component twins wherein component twins are digital representations of a physical component of an overall part. For example, and without limitation, component twin may include a digital representation of a gear within a physical part. In an embodiment, a part may only require simulation and/or testing on key components. In one or more embodiments, component twin may include emulated hardware within an overall system. In one or more embodiments, digital twin may include an asset twin (also known as product twin) wherein the asset twin is a digital version of the entire physical part. In one or more embodiments, asset twin may include a plurality of emulated hardware configured to emulate an entire physical system. In one or more embodiments, digital twin may include system twins wherein system twins include virtual representations of multiple parts or systems working together. In one or more embodiments, digital twins may include process twins wherein process twins include virtual representations of systems working together in a process. In one or more embodiments, digital twins may be used to emulate physical and/or digital systems. In one or more embodiments, digital twins may be used to emulate components on physical systems in order to ensure that software package 120 is operating in substantially similar environments to that s the intended recipients 128.

With continued reference to FIG. 1, operating environments 132 may be created and/or selected as a function of user input. In an embodiment, a user of apparatus 100 may indicate the particular operating environments 132 that need to be created based on intended recipients 128. In one or more embodiments, information needed to create operating environments 132 may be determined using recipients 128. This may include but are not limited to, hardware requiring emulation, software requiring simulation and the like. In one or more embodiments, recipients 128 may include information needed to create operating environments 132, such as but not limited to, processing power, network connectivity, available memory, available storage, and the like. In one or more embodiments, each recipient 128 may include a set of systems, hardware and/or software wherein the set may be used to create operating environment 132. In one or more embodiments, operating environment 132 may be create similar to that of virtual environment as described above. In one or more embodiments, operating environment 132 may run atop a type 1 hypervisor as described above and/or a type 2 hypervisor as described above. In one or more embodiments, processor 108 may determine what type of operating environments 132 need to be created based on recipients 128, wherein operating environments 132 may simulate and/or emulate systems and/or software of those associated with recipients 128. In one or more embodiments, a plurality of operating environment 132 may already exist and be located on database 116 and/or a cloud network 146 such as any cloud network as described in this disclosure. In one or more embodiments, in a first iteration of the processing of apparatus 100, a user may create multiple operating environments 132 wherein each operating environment 132 may be associated with at least one recipient 128. In one or more embodiments, following a first iteration of the processing, operating environments 132 may be iteratively used. In one or more embodiments, upon receipt of a new recipient 128, a new operating environment 132 may be created by a user for the current iterations and/or future iterations. A "user" for the purposes of this disclosure is an individual associated with apparatus 100. A user may include but is not limited to, an operator of apparatus 100, a computer engineer, an agent working on behalf of an entity that owns or manages apparatus 100 and the like. In one or more embodiments, database 116 may include a plurality of recipients 128 and associated operating environments 132. In one or more embodiments, selection of a particular set of recipients 128 may indicate a particular set of operating environments 132 to select. In one or more embodiments, creation of a new recipient 128 may indicate creation of a new operating environment 132. In one or more embodiments, operating environments 132 may be stored and/or retrieved on database 116 and/or a cloud network.

With continued reference to FIG. 1, operating environments 132 may be executed using a type 1 hypervisor and/or type 2 hypervisor as described above. In one or more embodiment, virtual machines may be used to create operating environments 132 wherein virtual machines may be used to emulate systems and/or software associated with that of recipients 128. In one or more embodiments, operating environments 132 may be instantiated on a cloud network. In one or more embodiments, operating environments 132, virtual machines, hypervisors and the like may be located on a cloud network wherein processor 108 may be configured to instantiate operating environment 132 on cloud network. In one or more embodiments, a cloud network may have the proper resources and requirements to ensure that operating environments 132 are not limited by the computing system in which they run on. In one or more embodiments, cloud networks may contain increased processing power, storage space, memory, and the like in comparison to computing device 104 wherein operating environments 132 may be executed and/or instantiated without fear of being limited by hardware and/or software. In one or more embodiments, processor 108 may be configured to communicate with a cloud network and/or database 116 to instantiate operating environment 132 for use of software package 120. In one or more embodiments, processor 108 may receive a configuration request in order to create, execute, and/or instantiate one or more operating environments 132. As used in this disclosure, a "configuration request" is a structured set of data or a command to provide a specific operational environment or resources. In some cases, configuration request may be sent by a software entity as described below or component such as, without limitation, a partition within virtual environment, asking another entity such as, without limitation, host OS or hypervisor to establish, modify, or provide a desired standard operating environment 132 (SOE). In a non-limiting example, processor 108 and/or a first partition on computing device 104 may include a management VM configured to monitor, manage, and/or administer overall operations and resources within virtual environment and/or operating environment 132. In a non-limiting example, a first partition may include, or at least interfacing with one or more health monitors, system health management PSSS, aircraft system monitoring PCS, operational mode management PCS, and/or the like.

With continued reference to FIG. 1, a "partition policy," for the purpose of this disclosure, is rules, constraints, and configurations for how a partition (or a virtual machine/container) within operating environment 132 accesses resources. In some cases, at least a partition policy may specify how much CPU, memory, storage, network bandwidth and/or the like a partition in question can utilize. In some cases, at least a partition policy may also determine the scheduling policy for a partition, for example, the partition's priority, operating time, or whether it's preemptible. In an embodiment, at least a partition policy may define a level of separation between plurality of partitions to ensure that one partition's operation does not adversely impact another's. In such embodiment, this may prevent failures from propagating. In some cases, partition policy may also outline what resources e.g., I/O devices, data files, network interfaces, and/or the like partition may be able to access. In some cases, partition policy may include a level of access (e.g., read, write, execute, and the like). In a non-limiting example, in an aviation system, at least a partition policy may be configured to ensure that a partition handling flight control logic gets a highest priority and is isolated from partitions handling non-critical tasks e.g., in-flight entertainment. In another non-limiting example, partition policies may balance computing resources allocation for achieving a desired system performance e.g., desired energy efficiency, ensuring that each VM get only the resources it needs. In one or more embodiments, operating environments 132 may be instantiated in any way similar to that of virtual environments as described in U.S. Nonprovisional application Ser. No. 18/395,149 filed on Dec. 22, 2023, having "APPARATUS AND METHOD FOR PROVIDING A SAFETY-CRITICAL OPERATING ENVIRONMENT (SCOE)", the entirety of which is incorporated herein by reference.

With continued reference to FIG. 1, operating environments 132 may include and/or be associated with DAL classifications 124. In one or more embodiments, each operating environment 132 may contain a DAL classification 124, wherein the DAL classification 124 may be used to determine the importance of software failure within each operating environment 132. For example, and without limitation, software failure in a DAL-E classified operating environment 132 may not cause harm to individuals whereas software failure associated with a DAL-A classified operating environment 132 may indicate that software failure can have catastrophic consequences. In one or more embodiments, each operating environment 132 may contain a DAL classification 124. In one or more embodiments, DAL classification 124 may be determined based on the particular software and/or system being simulated. For example, and without limitation, DAL classification 124 may be determined if operating environment 132 is simulating a military system or a flight system. In one or more embodiments, DAL classification 124 may be determined based on recipients 128 wherein each recipient 128 and/or grouping of recipient 128 may contain a DAL classification 124.

With continued reference to FIG. 1, in one or more embodiments, processor 108 is configured to execute software package 120 within each operating environment 132. In one or more embodiments, processor 108 is configured to execute software package 120 within one or more operating environments 132. In one or more embodiments, execution of software package 120 may include execution of an executable file within one or more operating environments 132. In one or more embodiments, software package 120 may be executed within one or more operating environments 132 wherein an executable file may be selected and run within operating environment 132. In one or more embodiments, processor 108 may be configured to transmit software package 120 to one or more operating environments 132. In one or more embodiments, processor 108 may be configured to configured to integrate software package 120 into operating environment 132 using pre-defined operational rule by instantiating software package 120 into at least one container, wherein the at least one container comprises a non-preemptible container runtime. In some cases, functions may be provided by at least one operational rule. In some cases, software package 120 may interact with other components via one or more interfaces (e.g., APIs). In an embodiment, software package 120 may be designed to be reusable and to provide certain functionality that may be integrated into one or more different operating systems or larger software applications. In a non-limiting example, at least one operational rule may include a series of rules or polices that dictate how software package 120 interacts with the system and/or the users. This may include, without limitation, utilizing computational resources, how it is executed, and/or the like. In a non-limiting example, in SCOE, such as avionics system as described herein, at least one operational rule may ensure that software package 120 does not interfere with any operation of other system components e.g., partitions within operating environment 132, that software package 120 may use dedicated system resources e.g., dedicated execution time slice, private static memory space or one or more other functionalities or services provided by other partitions within operating environments 132 in a way that does not degrade system performance, and that software package 120 may run within certain safety and security measurements as described in detail below.

With continued reference to FIG. 1, as used in this disclosure, a "container" is an executable package of software package 120 that includes all necessary elements needed to run it in any SOE. For example, and without limitation, at least a container may include code, runtime, system tools, system libraries, configurations, and/or the like. In some cases, at least a container may provide a "second layer" isolation or protection from operating environment 132 and other containers and/or partitions. In one or more embodiments, at least a container may include a standard unit of software that packages up code and all its dependencies so the integrated software package 120 may run under a desired performance from one SOE to another. In some cases, at least one container may be created based on software package 120 as described above. In a non-limiting example computing device 104 may include a container manager, wherein the "container manager," for the purpose of this disclosure, is a component used to manage and/or orchestrate a plurality of containers. In some cases, each partition of a plurality of partitions with computing device 104, may include a containerized application environment. In some cases, container manager may be configured to create and further deploy one or more containers in one or more operating environments 132. In some cases, plurality of containers may be run simultaneously. In an embodiment, container manager may include an engine that provide at least an operating system e.g., CentOS, Debian, Fedora, RHEL, Ubuntu, Windows, MacOS, and/or the like, wherein the engine may enable one or more containers to run in any partition or operating environment 132 consistently. In some cases, container manager may also be configured to validate the authenticity of software images, load container executables into container environments, connect container environments to operating service, and exports management APIs to other system management tools. In some cases, each operating environment 132 may include a container manager, and plurality of container managers of plurality of partitions may be (indirectly) communicative each other. In some cases, container manager with operating environments 132 may be known as "container agent." In a non-limiting example, software package 120 may become a container at runtime—when it is running on the container agent.

With continued reference to FIG. 1, a "non-preemptible container runtime," as described herein, is a runtime that once at least one container is up and running, it cannot be interrupted or preempted by other processor 108. In cases where at least one container is running at RTOS, certain level of service or response time may be guaranteed. In a non-limiting example, at least one container may be granted access to at least a processor 108, memory, and other resources as described above according to partition policy based on its priority, and once software package 120 is running, it may have exclusive access to dedicated resources until it completes execution, or a conclusion of dedicated execution time slice as described above. In a non-limiting example, at least one operational rule of software package 120 may include one or more safety-critical tasks which must not be delayed or interrupted by other non-critical tasks running on other partitions. Exemplary embodiments of at least one container may include a DOCKER container (that encapsulate any payload and dependencies into a single object," RTOS container, safety-certified container (designed to meet stringent certification requirements of regulatory bodies such as, without limitation, FAA or EASA), among others. In a non-limiting example, software package 120 may capture an FMS module, wherein the FMS module may be configured to perform critical functions related to navigation and flight planning defined by its operational rule. Such FMS module may be instantiated within a container in operating environment 132 and run with a non-preemptible runtime to ensure that navigation calculations and related data processing are not interrupted to maintain safety of flight operations.

With continued reference to FIG. 1, in one or more embodiments, instantiating and/or executing software package 120 into the at least one container and/or into at least one operating environment 132 may include extracting software metadata from software package 120, wherein the software metadata may include a plurality of software configuration parameters and a plurality of digital files. As used in this disclosure, "software metadata" is information related to software package 120. In a non-limiting example, software metadata may include a manifest file specifying software version number, required dependencies, configurations and/or the like. As described herein, "software configuration parameters" are parameters that dictate how software package 120 should be set up within a particular SOE. Exemplary software configuration parameters may include, without limitation, one or more environment variables, service endpoints, port numbers, paths to necessary libraries or dependencies, and/or other configuration data necessary for software package 120 to run correctly within operating environment 132. In some cases, at least a processor 108 may configure container manager within a first partition and/or a host operating system on computing device 104 through virtualization layer to initialize at least one container within operating environment 132 as a function of plurality of software configuration parameters by preparing container environment i.e., non-preemptible container runtime based on one or more software configuration parameters. This may be done, for example, by setting up correct file paths, configuring virtual network settings, installing required libraries, and/or the like based on plurality of software configuration parameters. Integrating software package 120 may further include deploying plurality of digital files within the initialized container. As used in this disclosure, "digital files" are a set of files each containing at least a portion of at least one operational rule. In some cases, plurality of digital files may include any files that necessary for the operation of integrated software package 120, for example, and without limitations, plurality of digital files may include one or more executable files, libraries, scripts, certificates for securities, data files, and/or the like. Container manager may place plurality of digital files in correct directories, setting permission, prepare container agent to execute plurality of digital files. In some cases, container agent may load at least one operational rule into non-preemptible container runtime. In a non-limiting example, at least one operational rule may govern how software package 120 operates within at least one container and operating environment 132 e.g., interaction with other software applications, utilization of dedicated resources, response to certain events, among others.

With continued reference to FIG. 1, software package 120 may be transmitted to one or more operating environments 132 and executed within one or more operating environments 132. In one or more embodiments, execution may be managed by processor 108 wherein processor 108 may receive instructions on how to execute software package 120 within each operating environment 132. In one or more embodiments, pre-defined operational rule may be used to instruct processor 108 on how to execute software package 120 with each operating environments 132. In one or more embodiments, code and/or instructions may be used to instruct processor 108 to deploy software package 120 within each operating environments 132. In one or more embodiments, virtualization platforms, such as but not limited to Docker or VirtualBox, may be used to manage each operating environments 132. In one or more embodiments, processor 108 may receive software configuration parameters which may include configurations for each operating environments 132, dependencies within each operating environments 132, and the like. In one or more embodiments, processor 108 may receive and/or generate a deployment script wherein the deployment script may include instructions to deploy software package 120 within each operating environment 132. In an embodiment, deployment script may be located on computing device 104 and/or stored on database 116 wherein deployment script may be altered for each iteration of the processing. In one or more embodiments, operating environments 132 within deployment script and software packages 120 may change for each iteration of the processing. In one or more embodiments, deployment script may be used to automate a process in which software package 120 may be transmitted to and/or deployed in multiple operating environments 132. In one or more embodiments, automation tools may be used for execution of deployment script wherein deployment script may execute upon user input from a user, selection of one or more recipients 128, selection of one or more operating environment 132 and the like. In one or more embodiments, software packages 120 may be deployed and/or executed within each operating environment 132 as a function of user input wherein a user may manually execute software package 120 within each operating environment 132. In one or more embodiments, operating environments 132 may be located on a cloud network as described above. In one or more embodiments, selecting one or more operating environments 132 as a function of software package 120 and recipients 128 may include instantiating one or more operating environments 132 on cloud network. In one or more embodiments, following selection of operating environments 132 processor 108 may be configured to instantiate operating environments 132 and configure them for receipt of software package 120. In one or more embodiments, instantiating operating environments 132 may include the use of virtualization platforms, configuration parameters, deployment scripts and the like.

With continued reference to FIG. 1, in one or more embodiments, processor 108 is configured to generate performance data 144 for each operating environment 132 of the one or more operating environments 132. "Performance data" for the purposes of this disclosure is information associated with the operation of software package 120 within each operating environment 132. For example, and without limitation performance data 144 may include information indicating times associated with the processing of information within software package 120, various issues during execution of software package 120, possible system crashes during execution of software package 120, memory usage and the like. In one or more embodiments, performance data 144 may include but is not limited to, memory usage, processing power usage, disk usage, various system crashes, times for processing information, the ability to perform a given set of tasks, boot times, the ability to communicate with other systems and/or software and the like. In one or more embodiments, performance data 144 may include response time wherein the response time includes the amount of time it may take for software package 120 to respond to an input. In one or more embodiments, performance data 144 may include throughput wherein throughput may include the amount of operations that can be performed within a given time frame. In one or more embodiments, performance data 144 may document errors and the amount of errors within a given time frame. In one or more embodiments, performance data 144 may measure scalability wherein scalability may indicate how well the software can handle increased workloads. In one or more embodiments, performance data 144 may include resource utilizations, security, and the like. In one or more embodiments, performance data 144 may differ for each operating environment 132. In one or more embodiments, software packages 120 within each operating environment 132 may operate differently due to differing available memory, differing available processing power, differing network conductivity and the like. In one or more embodiments, hardware, drivers, libraries, frameworks and the like may affect the performance of software package 120. In one or more embodiments, one or more profiling tools may be used to receive performance data 144. In one or more embodiments, profiling tools, such as but not limited to, perf, Visual Studio profiler, Intel VTune, Windows Performance Analyzer, MAC OS Instruments, and the like may be used to receive performance data 144. In an embodiment, profiling tools may allow for processor 108 to receive execution times, memory usage, system interactions and the like of software package 120. In one or more embodiments, processor 108 may use monitoring tools such as Prometheus, APM solutions and the like in order to monitor the performance of software package 120 in each environment as performance data 144. In one or more embodiments, processor 108 may be configured to receive logs of information from each software package 120. In one or more embodiments, processor 108 may be configured to receive performance data 144 from each operating environment 132. In one or more embodiments, one or more profiling tools may be used to receive performance data 144. In one of more embodiments, each operating environment 132 may contain a profiling tool configured to generate performance data 144, wherein the performance data 144 may be received by processor 108. In one or more embodiments, one or more debugging tools, log analyzers, performance monitoring tools may be used to generate performance data 144. In one or more embodiments, debuggers may allow individuals to inspect variables and determine the particular set of code that may be at issue. In one or more embodiments, debuggers may be used to identify the state of software package 120. In one or more embodiments, debuggers may be used to identify code errors, reproduce conditions in which the error occurred, and the like. In one or more embodiments, debuggers may include but are not limited to MSVC, LLDB, GDB and the like. In one or more embodiments, performance monitoring tools may be used to identify bottlenecks and monitor system performance and the like. In one or more embodiments, network analyzers may be configured to determine issues with network communication. In one or more embodiments, processor 108 may utilize one or more systems and/or software in order to receive performance data 144 wherein each system and/or software may be configured to receive a particular portion of performance data 144. For example, and without limitation, debuggers may be configured to determine a bug in the code whereas profiling tools may be used to determine the overall performance of a software. In one or more embodiments, processor 108 may receive metrics of software package 120 from one or more profiling tools and generate performance data 144 as a result. In one or more embodiments, processor 108 may be configured to generate performance data 144 for each operating environment 132 wherein performance data 144 include the performance of software package 120 and associated issues with the associated operating environment 132.

With continued reference to FIG. 1, performance data 144 may include vulnerabilities in which software package 120 may have when interacting with operating environment 132. Vulnerabilities may include but are not limited to failure to interact with the operating environment due to outdated software and/or hardware, configurations within the operating environment 132 do not allow for proper use of software package 120, third part libraries within operating environment 132 may be outdated or corrupts, the software may not contain the necessary privileges to carry out processes within operating environments 132, data leakage causing exposure of sensitive data, and the like. In an embodiment, performance data 144 may include vulnerabilities of software package 120 to operating in operating environment 132 such as lack of processing resources and the like. In one or more embodiments, generation and/or receipt of performance data may allow processor 108 to make determinations as to whether software package may be certified for use in recipient environments 134.

With continued reference to FIG. 1, in one or more embodiments, processor 108 may be configured to receive performance data 144 from a system profiler 148. A "system profiler" for the purposes of this disclosure is a component configured to receive detailed information about the software and hardware of a particular system. For example, and without limitation, system profile may be configured to receive performance metric of software package 120, hardware (and/or or emulated hardware 136) information from the surrounding operating environment 132, software configurations of software package 120, performance metrics, network information, system logs and the like. In an embodiment, system profiler 148 may be configured to monitor software package 120 and record information in the form of performance data 144. In one or more embodiments, system profiler 148 may be configured to transmit performance data 144 to processor 108 and/or computing device 104. In one or more embodiments, system profiler 148 may be configured to profile active virtual machines hosting operating environments 132 in which software packages 120 are situated. In one or more embodiments, a single system profiler 148 may be configured to receive data from each virtual machine and generate performance data 144. In one or more embodiments, each operating environment 132, virtual environment, virtual machine and the like may have a separate system profile wherein each system profile may be configured to receive performance data 144 from their respective environments. In one or more embodiments, a plurality of performance data 144 may exists wherein each performance data 144 is associated with each software package 120 within each operating environment 132.

With continued reference to FIG. 1, in one or more embodiments, processor 108 may be configured to compare performance data 144 to one or more performance thresholds 152. A "performance threshold" for the purposes of this disclosures is a predefined set of ranges or limits that can be used to determine the dependability of software package 120 within each operating environment 132. For example, and without limitation, performance threshold 152 may indicate that a software is limited to one crash per month wherein a software crashing more than once per month may indicate that the software is faulty. Similarly, performance threshold 152 may indicate that the execution time for a particular process should not take longer than a minute wherein an execution time associated with software package 120 lasting longer than a minute may indicate that software package 120 contains issues and may therefore not be reliable. In one or more embodiments, performance threshold 152 may include limits or ranges for each element within performance data 144 wherein an element exceeding a limit and/or failing to fall within a particular range may indicate that software package 120 may contain issues. In one or more embodiments, ranges or limits may include, but are not limited to, ranges associated with processing power, memory usage, read or write speeds, network connectivity, execution times, and the like. In an embodiment, each parameter measured within performance data 144 may be compared to a single performance threshold 152. In one or more embodiments, performance thresholds 152 may be generated by a user and stored on database 116. In one or more embodiments, processor 108 may be configured to receive performance thresholds 152 from database 116 and compare performance data 144 to performance thresholds 152. In one or more embodiments, performance thresholds 152 may be generated by processor 108. In one or more embodiments, processing, using an algorithmic logic unit (ALU) located on computing device 104 may generate, averages, standard deviations and the like from the plurality of performance data 144 and use the averages, standard deviations and the like to create performance threshold 152. In an embodiment, performance threshold 152 may be used to determine which operating environment 132 falls outside of a particular standard deviation or range. In one or more embodiments, a multiple sets of performance thresholds 152 may exists wherein set of performance thresholds 152 may be associated with a particular operating environment 132 and/or categorization of recipients 128 or operating environments 132. For example, and without limitation a first set of performance thresholds 152 may be used for operating environments 132 associated with weapons systems and a second set of performance thresholds 152 may be used for operating environments 132 associated with aviation. In an embodiment, each operating environment 132 and/or categorization of operating environment 132 may be held to differing standards and as a result may be compared to differing thresholds. In one or more embodiments, performance thresholds 152 may be selected based on intended recipients 128 or operating environments 132. In one or more embodiments, comparing the performance data 144 to the one or more performance thresholds 152 may include comparing the performance data 144 to the one or more performance thresholds 152 as a function of DAL classification 124. In one or more embodiments, each set of performance thresholds 152 may be associated with a DAL classification 124. For example, and without limitation, performance thresholds 152 associated with a DAL-E classification may contain less stringent ranges or limits in comparison to that of performance thresholds 152 associated with DAL-A classification. In one or more embodiments, DAL classifications 124 may be used to determine the level of safety and/or efficacy of a software required wherein operating environments 132 associated with higher DAL classifications 124 may require more stringent standards. In one or more embodiments, operating environments 132 associated with lower DAL classifications 124 may not require stringent standards due to the lack of harm involved. In one or more embodiments, software crashes, bottleneck issues and the like may be relatively tolerated within operating environments 132 associated with lower DAL classifications 124 in comparison to operating environments 132 associated with higher DAL classifications 124. In one or more embodiments, database 116 may contain one or more performance thresholds 152 for each DAL classification 124. In one or more embodiments, the set of performance thresholds 152 chosen may depend on the DAL classification 124 of the recipient 128 and/or operating environment 132 wherein each recipient 128 and/or operating environment 132 may use the performance threshold 152 corresponding to the same DAL classification 124.

With continued reference to FIG. 1, in one or more embodiments, processor 108 may be configured to generate feedback data 156 as a function of the comparison of the performance data 144 to the one or more performance thresholds 152. "Feedback data" for the purposes of this disclosure is information indicating the reliability of software package 120 as indicated by a comparison between performance data 144 and one or more performance thresholds 152. For example, and without limitation, feedback data 156 may include information indicating one or more performance thresholds 152 that have not been met. Continuing, feedback data 156 may indicate that software package 120 contained more than the determined limit of software crashes. In one or more embodiments, feedback data 156 may include information indicating one or more elements or parameters within performance data 144 have not met one or more performance thresholds 152. In one or more embodiments, each element and/or parameter not meeting a particular performance threshold 152 may indicate a particular issue with software package 120. For example, and without limitation, high memory usage may indicate a memory leak. In one or more embodiments, feedback data 156 may indicate the particular element of elements that have failed to meet their respective performance threshold 152. In one or more embodiments, feedback data 156 may be generated for each software package 120 and associated operating environment 132. In one or more embodiments, a user may be able to compare feedback data 156 associated with multiple operating environments 132 in order to determine which errors are specific to software package 120 and which errors are related to software package 120 and the respective operating environment 132. In one or more embodiments, feedback data 156 may indicate which performance thresholds 152 have not been met in order operating environments 132 as well. For example, and without limitation, feedback data 156 may indicate that bottleneck issues within a particular operating environment 132 may not be specific to the operating environment 132 and as a result, other operating environments 132 contained the same issue. Similarly, feedback data 156 may indicate that an issue was specific to the current operating environment 132. In one or more embodiments, feedback data 156 may include comparisons of multiple performance data 144 from differing operating environments 132 compared to performance thresholds 152 associated with said operating environments 132.

With continued reference to FIG. 1, feedback data 156 may include information indicating the source of the issue which cause a particular element not to meet or exceed a performance threshold 152. For example, and without limitation, feedback data 156 may indicate that the reason an element did not meet a performance threshold 152 was due to memory leakage, a particular software package 120 could not communicate with the surrounding operating environment 132 and the like. In one or more embodiments, feedback data 156 may be generated using a lookup table wherein elements that have not met a threshold may be looked up to determine an underlying cause. A "lookup table," for the purposes of this disclosure, is an array of data that maps input values to output values. A lookup table may be used to replace a runtime computation with an array indexing operation. In one or more embodiments, a lookup table may be used to correlate elements with underlying issues, wherein for example, memory utilization may be associated with a memory leak. In one or more embodiments, lookup table may be populated by a user and/or stored on database 116. In one or more embodiments, element and/or pairs of elements may be used to determine underlying issues using lookup table. In one or more embodiments, a pair of elements or parameters failing to meet a threshold may be associated with a single underlying issue.

With continued reference to FIG. 1, feedback data 156 may be generated as a function of a machine learning model. In one or more embodiments, computing device 104 may include a machine learning module to implement one or more algorithms or generate one or more machine-learning models to generate outputs. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 116, user inputs and/or be provided by a user. In other embodiments, a machine-learning module may obtain a training set by querying a communicatively connected database 116 that includes past inputs and outputs. Training data may include inputs from various types of databases, resources, libraries, dependencies and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to categories by tags, tokens, or other data elements. A machine learning module may be used to create a machine learning model and/or any other machine learning model using training data. Training data may be data sets that have already been converted from raw data whether manually, by machine, or any other method. In some cases, the machine learning model may be trained based on user input. For example, a user may indicate that information that has been output is inaccurate wherein the machine learning model may be trained as a function of the user input. In some cases, the machine learning model may allow for improvements to computing device 104 such as but not limited to improvements relating to comparing data items, the ability to sort efficiently, an increase in accuracy of analytical methods and the like.

With continued reference to FIG. 1, in one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from a database 116, dependencies within software container and/or be provided by a user. In other embodiments, machine-learning module may obtain a training set by querying a communicatively connected database 116 that includes past inputs and outputs. Training data may include inputs from various types of databases, resources, libraries, dependencies and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories.

With continued reference to FIG. 1, processor 108 may use a machine learning model such as feedback machine learning model 160 to generate feedback data 156. In one or more embodiments, feedback machine learning model 160 may receive as an input performance data 144 and/or performance thresholds 152 and output feedback data 156. In one or more embodiments, feedback data 156 may include information indicating the root cause of a particular issue associated with software package 120. In one or more embodiments, feedback data 156 may include information indicating if operating environment 132 was the cause of the issue and/or if software package 120 was the cause of the issue. In one or more embodiments, determining the source of an issue may allow for a user to make change and modify software package 120 to become more dependable in one or more operating environments 132. In one or more embodiments, feedback machine learning model 160 may be trained with feedback training data 164. In one or more embodiments, feedback training data 164 includes a plurality of performance data 144 and correlated performance thresholds 152 correlated to a plurality of feedback data 156. In an embodiment a particular parameter or set of parameters within performance data 144 failing to meet one or more performance thresholds 152 may be correlated to a particular set of feedback data 156. In one or more embodiments, feedback training data 164 may be generated by a user, $3^{rd}$ party, retrieved from a database 116 and the like. In one or more embodiments, feedback machine learning model 160 may be trained with feedback training data 164 wherein feedback data 156 may be generated as a function of feedback machine learning mode. In one or more embodiments, a user may provide feedback to feedback machine learning model 160 such as feedback indicating incorrect sources of error in order to train feedback machine learning model 160. In one or more embodiments, feedback machine learning model 160 may be iteratively updated and/or trained as a function of user input wherein user and/or end user may provide feedback following each iteration of the processing. In one or more embodiments, iteratively training feedback machine learning model 160 may allow for faster processing, optimization of computer efficiency and the like. In one or more embodiments, following each iteration of the processing, processor 108 may be configured to receive user input wherein a user may indicate if feedback data 156 was accurate and/or whether a particular element was the source of the issue within software package 120.

With continued reference to FIG. 1, in one or more embodiments, processor 108 may be configured to display performance data 144 and/or performance thresholds 152 through graphical user interface. In one or more embodiments, processor 108 may be configured to display any data as described herein such as but not limited to, feedback data 156, performance data 144, and the like.

With continued reference to FIG. 1, processor 108 may be configured to create a user interface data structure as a function of at least performance data 144. As used in this disclosure, "user interface data structure" is a data structure representing a specialized formatting of data on a computer configured such that the information can be effectively presented for a user interface. User interface data structure may include any information as described in this disclosure, such as but not limited to performance data 144, feedback data 156 and the like.

With continued reference to FIG. 1, processor 108 may be configured to transmit the user interface data structure to a graphical user interface. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. Processor 108 may transmit the data described above to database 116 wherein the data may be accessed from database 116. Processor 108 may further transmit the data above to a device display or another computing device 104. In one or more embodiments, transformations, modifications and the like made to whole slide image and/or digital slide may be placed within user interface data structure 168 in order to be visualized through a user interface.

With continued reference to FIG. 1, apparatus 100 may include a graphical user interface (GUI 168). For the purposes of this disclosure, a "user interface" is a means by which a user and a computer system interact. For example, through the use of input devices and software. In some cases, processor 108 may be configured to modify graphical user interface as a function of at least performance data 144 and visually present performance data 144 through GUI 168. A user interface may include graphical user interface, command line interface (CLI), menu-driven user interface, touch user interface, voice user interface (VUI), form-based user interface, any combination thereof and the like. In some embodiments, a user may interact with the user interface using a computing device 104 distinct from and communicatively connected to processor 108. For example, a smart phone, smart tablet, or laptop operated by the user and/or participant. A user interface may include one or more graphical locator and/or cursor facilities allowing a user to interact with graphical models and/or combinations thereof, for instance using a touchscreen, touchpad, mouse, keyboard, and/or other manual data entry device. A "graphical user interface," as used herein, is a user interface that allows users to interact with electronic devices through visual representations. In some embodiments, GUI 168 may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in graphical user interface. Persons skilled in the art, upon reviewing the entirety of this disclosure, will be aware of various ways in which a graphical user interface and/or elements thereof may be implemented and/or used as described in this disclosure.

With continued reference to FIG. 1, GUI 168 may contain one or more interactive elements. An "interactive element" for the purposes of this disclosure is an element within a graphical user interface that allows for communication with apparatus 100 by a user. For example, and without limitation, interactive elements may include push buttons wherein selection of a push button, such as for example, by using a mouse, may indicate to system to perform a particular function and display the result through graphical user interface. In one or more embodiments, interactive element may include push buttons on GUI 168, wherein the selection of a particular push button may result in a particular function. In one or more embodiments, interactive elements may include words, phrases, illustrations and the like to indicate the particular process the user would like system to perform. In one or more embodiments, interaction with interactive elements may result in the display of performance data 144. In one or more embodiments, GUI 168 may be configured to visualize differing portions of performance data 144 wherein interactive element may be configured to allow for viewing of a particular portion of performance data 144.

With continued reference to FIG. 1, apparatus 100 may further include a display device communicatively connected to at least a processor 108. "Display device" for the purposes of this disclosure is a device configured to show visual information. In some cases, display device may include a liquid crystal display (LCD), a cathode ray tube (CRT), a plasma display, a light emitting diode (LED) display, and any combinations thereof. Display device may include, but is not limited to, a smartphone, tablet, laptop, monitor, tablet, and the like. Display device may include a separate device that includes a transparent screen configured to display computer generated images and/or information. In some cases, display device may be configured to visually present one or more data through GUI 168 to a user, wherein a user may interact with the data through GUI 168. In some cases, a user may view GUI 168 through display device. In one or more embodiments display device may be located on remote device wherein a user may access performance data 144 through remove device.

With continued reference to FIG. 1, processor 108 may be configured to display performance data 144 through GUI 168 as a function of the user interface data structure. In one or more embodiments, processor 108 may be configured to graphically display performance data 144 through graphical user interface. For the purposes of this disclosure, data that is "graphically displayed" refers to data presented in a graphical format. A "graphical format" for the purposes of this disclosure is a visual representation of textual information. For example, and without limitation, textual information such as numerical values may be plotted on an X-Y chart in order to show data within a graphical format. In one or more embodiments, graphical format mat may allow for visualization of textual data such as performance data 144 in order to view performance data 144 through graphical user interface. In one or more embodiments, graphical format may include X-Y charts showing trends within performance data 144 associated with operating environment 132. In one or more embodiments, graphical format may include color coded textual data wherein colors may indicate whether a particular element within performance data 144 met or exceeded a particular performance threshold 152. In one or more embodiments, textual data within performance data 144 may be color coded to indicate a degree of similarity between one or more sets of performance data 144. In one or more embodiments, performance data 144 may be visualized through an X-Y chart wherein data may be mapped over a given period of time. In one or more embodiments, a horizontal axis on the X-Y plot may indicate the passage of time whereas the vertical axis may indicate changes in performance over the given time. In one or more embodiments, multiple sets of performance data 144 may be graphed on the same X-Y chat such that a user can visually compare performance of software package 120 within one or more operating environments 132. In one or more embodiments, multiple X-Y charts may exist wherein each X-Y chart may focus on a particular parameter. In one or more embodiments, processor 108 may be configured to display performance data 144 in a graphical format wherein performance data 144 may be graphed and/or charted. In one or more embodiments, performance thresholds 152 may be graphed as well wherein performance thresholds 152 may indicate the upper and/or lower bounds within the X-Y chart. This may be explained in further detail below such as in reference to at least FIG. 2. In one or more embodiments, GUI 168 may be configured to visualize performance data 144 in real-time wherein performance data 144 may be graphed as it is received. In an embodiment, performance data 144 may be viewed in real-time wherein a user may view performance data 144 during execution of software package 120. In one or more embodiments, processor 108 may receive performance data 144 in real time and visually view performance data 144 through GUI 168 in order to determine the source of issues as they occur.

With continued reference to FIG. 1, processor 108 is configured to certify software package 120 for each operating environment 132 of the one or more operating environments 132. In one or more embodiments, a process of certifying software package 120 may include a process of configuring software package 120 for use in external environments wherein external environments may include systems, software and/or environments associated with recipients 128. For example, and without limitation, certifying software package 120 may include modifying software package 120 to remove bugs, issues and the like as indicated within performance data 144 and/or feedback data 156. In one or more embodiments, certifying software package 120 may include an indication stating that software package 120 has been tested and approved to be operational within external environments. In one or more embodiments, certifying software package 120 may include digitally signing software package 120 and/or appending a digital signature 172 to software package 120. In one or more embodiments, digitally signing software package 120 may include appending a digital signature 172 to software package 120 and transmitting software package 120 with a digital signature 172. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described in this disclosure. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature 172 is equivalent to possession of the private decryption key and/or device-specific secret. Likewise, if a message making up a mathematical representation of file is well-designed and implemented correctly, any alteration of the file may result in a mismatch with the digital signature 172; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

With continued reference to FIG. 1, in some embodiments, digital signatures 172 may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient 128 to perform a task. The authorization may be the authorization to access a given datum. The authorization may be the authorization to access a given process. In some embodiments, the certificate may identify the certificate authority. The digital certificate may include a digital signature 172.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature 172 confirms the identity of the entity and links the file to the entity in a verifiable way. Digital signature 172 may be incorporated in a digital certificate, which is a document authenticating the entity possessing the private key by authority of the issuing certificate authority and signed with a digital signature 172 created with that private key and a mathematical representation of the remainder of the certificate. In other embodiments, digital signature 172 is verified by comparing the digital signature 172 to one known to have been created by the entity that purportedly signed the digital signature 172; for instance, if the public key that decrypts the known signature also decrypts the digital signature 172, the digital signature 172 may be considered verified. Digital signature 172 may also be used to verify that the file has not been altered since the formation of the digital signature 172.

With continued reference to FIG. 1, processor 108 may be configured to append digital signature 172 to software package 120 wherein data signature may be attached or added to the end of a data file, such as to the end of software package 120. In one or more embodiments, processor 108 may be configured to transmit digital signature 172 along with software package 120. In one or more embodiments, software package 120 and digital signature 172 may be transmitted as separate files and/or within separate transmission. In one or more embodiments, processor 108 may take a hash (wherein a hash may include a string generated by characters within software package 120) of software package 120 and encrypt the hash with the sender/user's private key. In one or more embodiments, digital signature 172 may be appended to software package 120 wherein a recipient 128 may confirm the authenticity of software package 120 using the sender's public key. In one or more embodiments, a hash function may be applied to upload data, wherein the hash function may be configured to create a string of fixed size using information from within software package 120. In one or more embodiments, the hash may be encrypted using a private key belonging to the sender, such as the user. In one or more embodiments, the hash may be appended to upload data. In one or more embodiments, the recipient 128 of upload data, such as an individual and/or computing device 104, may decrypt the hash using a public key and compare the decrypted hash to an independently generated hash. In one or more embodiments, comparison of two hashes may authenticate the origin of software package 120.

With continued reference to FIG. 1, in one or more embodiments, appending digital signature 172 to software package 120 may include encrypting software package 120. In one or more embodiments, processor 108 may be configured to encrypt software package 120 using one or more cryptographic processes as described above. In one or more embodiments, processor 108 may utilize a cryptographic system as described above to convert plaintext within upload data to ciphertext. In one or more embodiments, a user may encrypt upload data wherein a software and/or operating environment 132 configured to receive software package 120 may contain the decryption key. In an embodiment, encryption may ensure that data is not tampered and/or viewed during transmission and that the proper operating environment 132, recipient environment 134, and/or system associated with recipient 128 receives the proper software package 120. In one or more embodiments, encrypting software package 120 may include the production of cryptographic hashes. In one or more embodiments, processor 108 may generate one or more cryptographic keys using one or more key generation processes as described in this disclosure. In one or more embodiments, digital signature 172 and/or software package 120 may be encrypted using an encryption key. In one or more embodiments, use of a digital signature 172 may signify to recipient 128 that software package 120 has been properly tested. In one or mor embodiments, digital signature 172 may allow recipient 128 to confirm the authenticity and/or the sender of software package 120.

With continued reference to FIG. 1, in one or more embodiments, certifying software package 120 may include modifying software package 120 for use in recipient environment 134. In one or more embodiments, operating environment 132 132 may include a digital twin of recipient environment 134. In one or more embodiments, certification may include a determination that software package 120 is qualified to be used within recipient environment 134. In one or more embodiments, digital signature 172 may inform recipient 128 and/or recipient environment 134 that software package 120 is suitable for recipient environment 134. In one or more embodiments, certifying software package 120 may include comparing software parameter 126 of software package 120 to system parameters within recipient environment 134. In one or more embodiment, processor 108 may be configured to ensure that recipient environment 134 may be capable of handling software package 120. In an embodiment, each recipient 128 may contain associated parameters wherein the parameters may be used to determine if software package 120 is compatible with recipient environment 134. In one or more embodiments, processor 108 may compare software parameters 126 to parameters associated with recipient 128 in order to ensure that software package 120 is suitable for recipient environment 134.

With continued reference to FIG. 1, certifying software package 120 may include determining whether performance data 144 exceeds one or more performance thresholds 152 as described above. In one or more embodiments, in order to ensure that software package 120 is suitable for transmission, performance data 144 associated software package 120 may be compared to performance thresholds 152. In an embodiment, certification of software package 120 may include a comparison of performance data 144 to performance thresholds 152. In one or more embodiments, a set of performance thresholds 152 may be generated, created and/or selected for each recipient 128 wherein performance data 144 may be compared to performance thresholds 152. In one or more embodiments, certification of software package 120 may include an indication that software package 120 adhered to one or more performance thresholds 152 as indicated by performance data 144. In one or more embodiments, processor 108 may be configured to certify software package 120 only in instances in which processor 108 meets one or more performance thresholds 152. In one or more embodiments, system profile may be used to receive performance data 144 from each operating environment 132 as described above. In one or more embodiments, performance data 144 may then be compared to performance thresholds 152. In one or more embodiments, feedback data 156 may be used to provide a user with information indicating why a performance threshold 152 was not met. In an embodiment, a user may modify software package 120 and instantiate software package 120 within the operating environment 132 again until performance thresholds 152 are met. In one or more embodiments, following adherence to performance thresholds 152, processor 108 may then certify software package 120 for deployment and/or transmission to recipient environments 134. In one or more embodiments, feedback data 156 may be generated in instances in which certification of software package 120 cannot be met, wherein feedback data 156 may indicate how to modify software package 120 in order to allow for software package 120 to be certified. In one or more embodiments, certifying software package 120 may include generating feedback data 156 associated with a comparison between performance data 144 and performance thresholds 152. In one or more embodiments, processor 108 may be configured to execute software package 120 within each operating environment 132, receive performance data 144, compare performance data 144 to performance thresholds 152 and certify software package 120 as a function of the comparison. In one or more embodiments, processor 108 may further be configured to generate feedback data 156, wherein recipients 128 may be able to view various weaknesses associated with software package 120. In an embodiment, feedback data 156 may be transmitted with software package 120 in order to inform recipient 128 of the performance of software package 120 with the associated operating environment 132. In one or more embodiments, processor 108 may be configured to execute software package 120 within the one or more operating environments 132. In one or more embodiments, executing software package 120 may include receiving performance data 144 associated with the software package 120. In one or more embodiments, certifying the software package 120 for each operating environment 132 of the one or more operating environments 132 includes comparing the performance data 144 to one or more performance thresholds 152.

With continued reference to FIG. 1, in one or more embodiments, certification of software package 120 may result in the generation of certified software package. A "Certified software package" for the purposes of this disclosure is a software package 120 that has been certified for use. In one or more embodiments, certified software package may be certified in any way as described in this disclosure. In one or more embodiments, certified software package may include digital signature 172 and/or any other indicators which may put a recipient 128 on notice that software package 120 has been tested and approved for use. As used herein, the terms 'software package 120' and 'certified software package' may be used interchangeably throughout this disclosure. For example, and without limitation, any transmission processes as described in this disclosure with respect to software package 120 may include certified software package as well.

With continued reference to FIG. 1, in one or more embodiments, processor 108 is configured to transmit software package 120 and/or certified software package to one or more recipients 128. In one or more embodiments, each certified software package may be approved for use for a particular recipient 128 and/or grouping of recipients 128. In one or more embodiments, each software package 120 tested and executed within each operating environment 132 may be certified for use in the same or similar operating environments 132. For example, and without limitation, a certified software package may be certified only in recipient environments 134 that were virtually represented within operating environments 132. In one or more embodiments, each certified software package may differ due to differing certification constraints, such as for example, differing performance thresholds 152. In one or more embodiments, certified software package may indicate the particular recipient 128, recipient environments 134, and/or grouping thereof in which software package 120 may be approved for use. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. In one or more embodiments, processor 108 may be configured to transmit software package 120 to database 116 and/or a network server and transmit software package 120 from the database 116 to one or more recipients 128 and/or recipient environments 134. In one or more embodiments, software package 120 may be stored on database 116, wherein processor 108 may be configured to notify recipients 128 that a software package 120 is ready to be received. In one or more embodiment, software package 120 may first be transmitted to a database 116 to ensure proper transmission to one or more recipients 128.

With continued reference to FIG. 1, in one or more embodiments it may be the case that software package 120 may be large in size and/or the location of one or more recipients 128 and/or recipient environments 134 may cause network transmission delays. In one or more embodiments, processor 108 may be configured to transmit software package 120 using delay tolerant network 176. Delay tolerant network 176 (DTN) is a network communication system in which data is transmitted into smaller units in order to facilitate transmission of data in unreliable or intermittent networks. For example, and without limitation, recipient environments 134 may be located on a remote device located within the ocean or on an aircraft wherein network connectivity may be intermittent and/or slow. In another non limiting example, recipient environments 134 may exist on remote devices that may be located beneath the surface of the earth wherein network connections may be sporadic and/or intermittent. In one or more embodiments, software package 120 may be divided into a plurality of data bundles 180 wherein each data bundles 180 includes a portion of software package 120. In one or more embodiments, data bundles 180 may be transmitted independently, such that software package 120 may be transmitted in portions. In one or more embodiments, data bundles 180 may be independently encrypted to ensure further security. In one or more embodiments, processor 108 may be configured to create a plurality of data bundles 180 and encrypt each data bundle 180. In one or more embodiments, processor 108 may be configured to assign a unique identifier to each data bundle 180, wherein the unique identifier may be used to determine the placement of each data bundle 180 when they are all ultimately received and combined to create software package 120. In one or more embodiments, unique identifiers associated with data bundles 180 may be encrypted to ensure that an unwanted recipient 128 may not intercept data bundles 180 and combine them to create software package 120 and/or certified software package. In one or more embodiments, both the data bundles 180 and the unique identifiers may be encrypted with similar or differing encryption processes to ensure a two level system of protection. In one or more embodiments, data bundles 180 may be transmitted across participating nodes 184. A “participating node” for the purposes of this disclosure refers to a device or a network that participates in the communication process between computing device 104 and operating environment 132. In one or more embodiments, participating nodes 184 may be responsible for the transmission of data bundles 180. In one or more embodiments, participating nodes 184 may include networks, devices and/or remote devices that can receive, store and transmit data bundles 180. In one or more embodiments, operating environments 132 may be located on devices with sporadic and/or intermittent network connections wherein data bundles 180 may be transmitted across participating nodes 184 until they arrive at their final destination. In one or more embodiments, processor 108 may be configured to determine a route along one or more participating nodes 184 between a source node and a destination node. In one or more embodiments, the source node may include the source of the transmission of software package 120 and/or data bundles 180 such as computing device 104 and/or database 116. In one or more embodiments, the destination node includes the final destination of software package 120 and/or data bundles 180 such as a device in which recipient environment 134 may be running on. In one or more embodiments, processor 108 may be configured to determine a path among participating nodes 184, wherein data bundles 180 may be transmitted to a corresponding node until they reach their final destination. In one or more embodiments, routing algorithms may be used to determine the most optical path from a source node to a destination node. In one or more embodiments, routing algorithms may depend on the connection between participating nodes 184, the storage capacity of participating nodes 184, the historical success of a participating node 184 and the like. In one or more embodiments, processor 108 may be configured to determine one or more paths in which data bundles 180 may be transmitted wherein the paths include one or more nodes connected to one another. In one or more embodiments, during instances in which a connection is made, data may be transferred one or more participating node 184 to another until the data bundles 180 arrive at their final destination.

With continued reference to FIG. 1, processor 108 may use predictive modeling to determine which participating nodes 184 should be selected for transmission of data bundles 180. In one or more embodiments, predictive modeling may allow for predictions of future and/or anticipated network connections based on historical data, wherein participating nodes 184 may be selected as a result. In one or more embodiments, processor 108 may use adaptive modeling to reroute data bundles 180 in order to increase the transmission rate of data bundles 180. In one or more embodiments, processor 108 may be configured to select nodes based on their ability to transmit data. In one or more embodiments, processor 108 may assign data bundles 180 to selected participating nodes 184 based on the size of data bundles 180 and the capacity of participating nodes 184. In one or more embodiments, processor 108 may utilize predictive modeling, adaptive modeling, selection of nodes and the like as a function of a machine learning model. The machine learning model may include any machine learning model as described in this disclosure. Processor 108 may use a machine learning module, such as a node machine learning module for the purposes of this disclosure, to implement one or more algorithms or generate one or more machine-learning models, such as a node machine learning model to determine one or more paths for data bundles 180 to be transmitted along. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. A machine learning module, such as node machine learning module, may be used to create node machine learning model and/or any other machine learning model using training data. Node machine learning model may be trained by correlated inputs and outputs of training data. Training data may be data sets that have already been converted from raw data whether manually, by machine, or any other method. Node training data may be stored in database 116. Node training data may also be retrieved from database 116. In some cases node machine learning model may be trained iteratively using previous inputs correlated to previous outputs. For example, processor 108 may be configured to store participating node 184 paths and their corresponding transmission from current iterations to train the machine learning model. In some cases, the machine learning model may be trained based on user input. For example, a user may indicate that determined paths or routes were unreliable and/or slow wherein the machine learning model may be trained as a function of the user input. In some cases, the machine learning model may allow for improvements to computing device 104 such as but not limited to improvements relating to comparing data items, the ability to sort efficiently, an increase in accuracy of analytical methods and the like. In one or more embodiments, node training data may include a plurality of source nodes and destination nodes correlated to a plurality of node paths. In an embodiment, a node path may include a route from a source node to a destination node. In one or more embodiments, node machine learning model may be configured to output node paths based on source nodes and destination nodes. In one or more embodiments, node machine learning model may be trained using historical data such as transmissions made on previous iterations. In an embodiment, historical data may indicate the most optical node paths between source node and destination node. In one or more embodiments, following each iteration node paths and their corresponding transmission time may be used to iteratively train machine learning model in order to create more efficient node paths. In one or more embodiments, training of node machine learning model may allow for selection of more efficient node paths and may increase the reliability of a transmission. In one or more embodiments, each participating node 184 may include a correlated storage capacity, wherein the correlated storage capacity may indicate the maximum storage size of a data bundles 180. In one or more embodiments, processor 108 may be configured to assign data bundles 180 to node paths based on storage size using node machine learning model. In one or more embodiments, processor 108 may be configured to identify a plurality of participating nodes 184 on a network, wherein processes may be configured to determine node path as a function of the plurality of participating nodes 184. In one or more embodiments, node machine learning model may be configured to receive plurality of participating nodes 184, including source node and destination node wherein node machine learning model may be configured to generate node path from source node to destination node.

With continued reference to FIG. 1, processor 108 may be configured to identify recipients 128 and transmit software package 120 as of an update request. In one or more embodiments, processor 108 may be configured to store software package 120 and/or certified software package on a cloud network, server and the like until an update request is received. Upon receipt of update, request, processor 108 may be configured to transmit software package 120. An "update request" for the purposes of this disclosure is a communication made by one or more recipients 128 seeking receipt of software package 120. For example, and without limitation, recipients 128 may transmit an update request to determine if new update data 122 has been created. In one or more embodiments, recipients 128 may communicate with a cloud network to continuously, periodically and/or systematically request software package 120. In one or more embodiments, recipients 128 may transmit update requests to a cloud network and/or to computing device 104 wherein processor 108 may be configured to identify recipients 128 and transmit software package 120 if conditions allow. In one or more embodiments, software package 120 may be stored on a central network and/or database 116 until update request is received. In one or more embodiments, recipients 128 may confirm that software package 120 is suitable with recipient environment 134 based on system parameters.

With continued reference to FIG. 1, processor 108 may be configured to receive operation data 188 following receipt of software package 120 by recipients 128. "Operation data" for the purposes of this disclosure is information associated with the operation of software package 120 within a system associated with a recipient 128 or a recipient environment 134. For example, and without limitation operation data 188 may include information indicating times associated with the processing of information within software package 120, various issues during execution of software package 120, possible system crashes during execution of software package 120, memory usage and the like. In one or more embodiments, operation data 188 may include performance data 144 that has been received from recipient environment 134. In one or more embodiments, operation data 188 may include the same or similar categories of information wherein operation data 188 may instead be received from recipient environment 134. In one or more embodiments, operation data 188 may include element similar to that of performance data 144. In one or more embodiments, operation data 188 may be received in any way similar to that of performance data 144 as described in this disclosure. For example, and without limitation, a system profiler located within recipient environment 134 may be used to generate operation data 188 and transmit operation data 188. In one or more embodiments, software package 120 may be configured transmit operation data 188 wherein software package 120 may contain instructions and/or code to generate operation data 188 and transmit operation data 188 to a central sever, database 116 and the like that may be accessed by processor 108.

With continued reference to FIG. 1, processor 108 may be configured to iteratively receive operation data 188 wherein operation data 188 may be received every week, every month, following execution of one or more process within software package 120, following the conclusion of one or more processes within software package 120 and the like. In one or more embodiments, operation data 188 may be transmitted form recipients 128, periodically and/or following a system malfunction such as a crashing of software package 120. In one or more embodiments, processor 108 may be configured to receive operation data 188 iteratively wherein processor 108 may monitor execution and/or performance of software package 120 within recipient environments 134.

With continued reference to FIG. 1, processor 108 may be configured to compare performance data 144 and operation data 188. In an embodiments, processor 108 may be configured to generate and/or receive performance data 144 during execution of software package 120 within operating environment 132. In one or more embodiments, processor 108 may be configured to store performance data 144 within database 116 for further use. In one or more embodiments, following transmission of software package 120, processor 108 may be configured to receive operations data and compare performance data 144 to operations data. In an embodiment, performance data 144 associated with a recipient 128 may be compared to operations data associated with the same recipient 128. In one or more embodiments, processor 108 may compare operations data and performance data 144 in order to detect inconsistencies between operating environment 132 associated with the recipient 128 and recipient environment 134. In an embodiment, operating environment 132 may include a virtual representation of recipient environment 134 wherein inconsistencies between performance data 144 and operation data 188 may indicate that there are noticeable changes between operating environment 132 and recipient environment 134. In one or more embodiments, processor 108 may be configured to generate deviation data 192 as a function of a comparison between performance data 144 and operation data 188. "Deviation data" for the purposes of this disclosure is information indicating inconsistencies between measured values within performance data 144 and measured values within operation data 188. For example, and without limitation, performance data 144 may indicate that on average 2 system crashes may occur a month within operating environment 132 whereas operation data 188 may indicate that on average 4 system crashes occur a month within recipient environment 134. In one or more embodiments, deviation data 192 may include information indicating deviations such as changes in processing power, changes in memory usage, changes in bug related issues, changes associated with interactions with an outside environment and the like. In one or more embodiments, deviation data 192 may be used to determine if the operating environment 132 used to test software package 120 was a proper virtual representation of recipient environment 134. In one or more embodiments, deviations between performance data 144 and operation data 188 may indicate that operating environments 132 are not proper virtual representations. In one or more embodiments, deviation data 192 may indicate deviations falling outside of a standard deviation, outside of a particular range and the like. In one or more embodiments, operation data 188 and performance data 144 may be compared to performance thresholds 152 wherein differences between performance data 144 and operation data 188 with respect to reaching thresholds may be included within deviation data 192. In one or more embodiments, differing measured values between operation data 188 and performance data 144 may be permitted so long as operation data 188 and performance data 144 adhere or fail to adhere to similar thresholds. For example, and without limitation, it may be that a value within operation data 188 may widely differ from a similar value within performance data 144 wherein both values may still meet their respective performance thresholds 152. In one or more embodiments, deviation data 192 may indicate values within operation data 188 and performance data 144 that contain inconsistent adherence to a particular performance threshold 152. In one or more embodiments, deviation data 192 may include feedback data 156 as described above wherein feedback data 156 may indicate the source of the issue. In one or more embodiments, feedback data 156 may only include the source of issues for inconsistent values within operation data 188 and performance data 144. In one or more embodiments, deviation data 192 may put a user on notice that software package 120 is not operating as intended. In one or more embodiments, deviation data 192 may put a user on notice that the operating environment 132 in which software package 120 was executed was not a proper virtual representation. In one or more embodiments, operation data 188 may be used to generate feedback data 156 wherein processor 108 may compute and/or use operation data 188 in any way similar to that of performance data 144. In one or more embodiments, processor 108 may be configured to compare feedback data 156 generated from performance data 144 and feedback data 156 generated from operations data to distinguish between issues within operating environment 132 and recipient environments.

Figure 2:
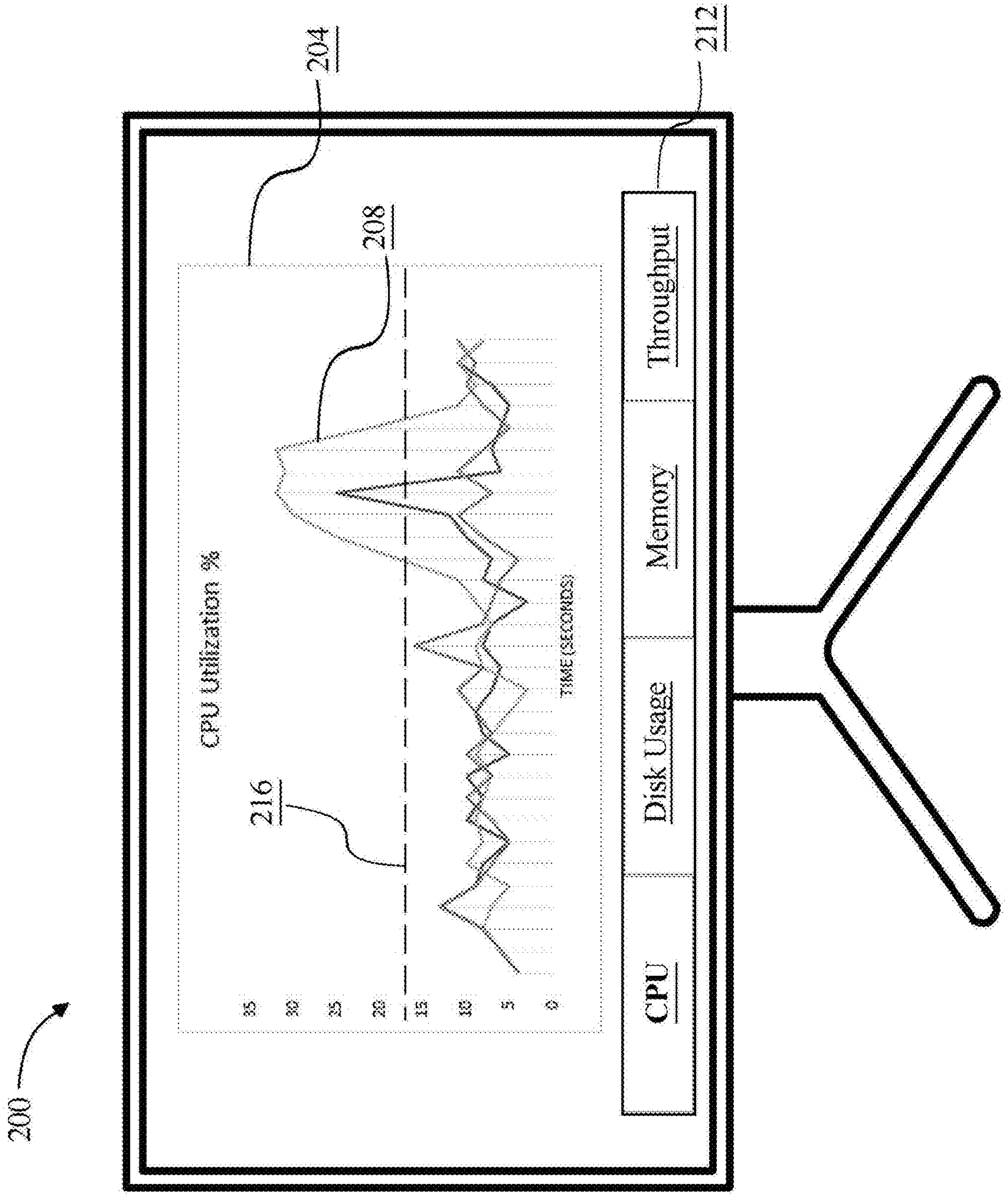
FIG. 2 illustrates an exemplary embodiment of a graphical user interface in accordance with the subject disclosure.

Referring now to FIG. 2, an exemplary embodiment of a graphical user interface 200 is described. In one or more embodiments, graphical user interface 200 (GUI) may include any GUI 200 as described in this disclosure. In one or more embodiments, GUI 200 may be configured to display information, such as performance data (as described in reference to FIG. 1) in a graphical format 204. In this instance, graphical format 204 may include an X-Y chart which plots performance over a given time. In one or more embodiments, performance may be categorized and compared to each operating environments, wherein for example, CPU usage of operating environments may be compared, Memory usage of operating environments may be compared, Disk usage of operating environments may be compared and the like. In the current embodiments, graphical format 204 may include a two dimensional chart in which time is represented along a horizontal axis and an element within performance data, such as CPU utilization may be represented along the vertical axis. In one or more embodiments, multiple operating environments may be visualized within the same graph or chart. In one or more embodiments, operating environments and/or software packages within each operating environment may be represented as trendlines 208 wherein each trendline 208 on a graph may be associated with a specific operating environment. In one or more embodiments, multiple trendlines 208 may be visualized in order to allow for a user to view real time performance changes of software package within each operating environment. In one or more embodiments, performance data may be graphed over time such that a user may determine at what instance a particular software package may have had issues. In one or more embodiments, GUI 200 may contain interactive elements 212 which allow a user to select particular portions of performance data to be viewed within graphical user interface 200. In an embodiment, performance data may include a plurality of data such as disk usage, memory usage and the like wherein a user may individually determine the performance of each parameter individually and/or in comparison to other operating environments. In an embodiment, selection of interactive element 212 may signify to processor to select a particular portion of data to be viewed within graphical format 204. In one or more embodiments, GUI 200 may visualize performance thresholds as graphical limits 216 wherein graphical limits may include horizontal lines indicating a limit that should not be exceeded. In one or more embodiments, graphical limits 216 may be viewed as dotted horizontal lines wherein a user may visually determine when a particular trendline 208 and/or software package has exceeded a graphical limit 216 and/or performance threshold. In one or more embodiments, graphical limits 216 may allow a user to determine at which instance software package may have exceeded a performance threshold.

Figure 3:
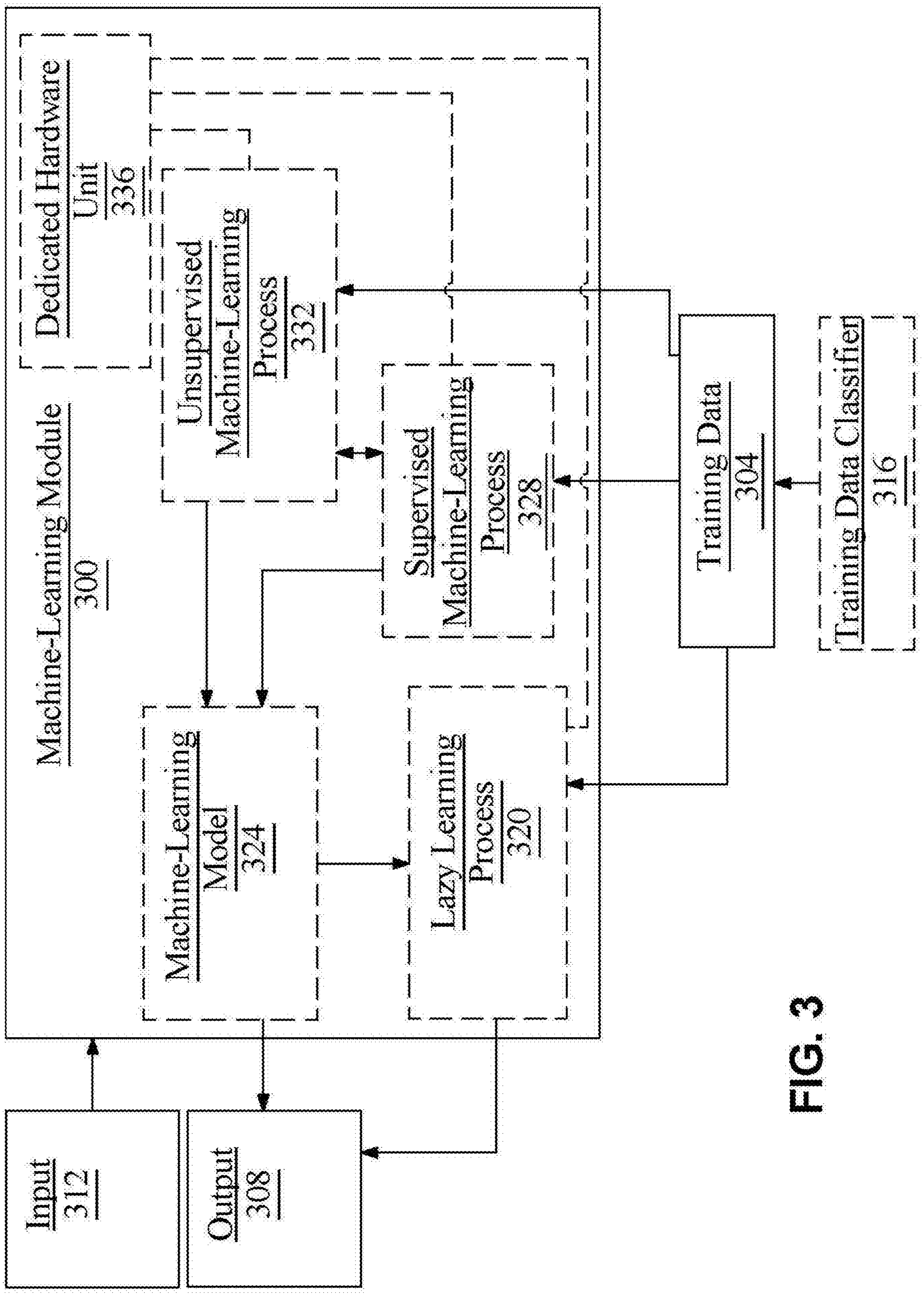
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process,"

as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include inputs such as performance data and/or performance thresholds wherein outputs may include outputs such as feedback data.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to performance categorizations, such as but not limited to, memory usage, disk usage, memory utilization and the like.

Still referring to FIG. 3, computing device 304 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)+P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 304 may then calculate a likelihood table by calculating probabilities of different data entries and classification labels. Computing device 304 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device 304 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively, or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, santization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation—of a set or subset of values:

$$X_{new} = \frac{X - X_{min}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{min}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include input such as performance data and/or performance thresholds as described above as inputs, outputs such as feedback data as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
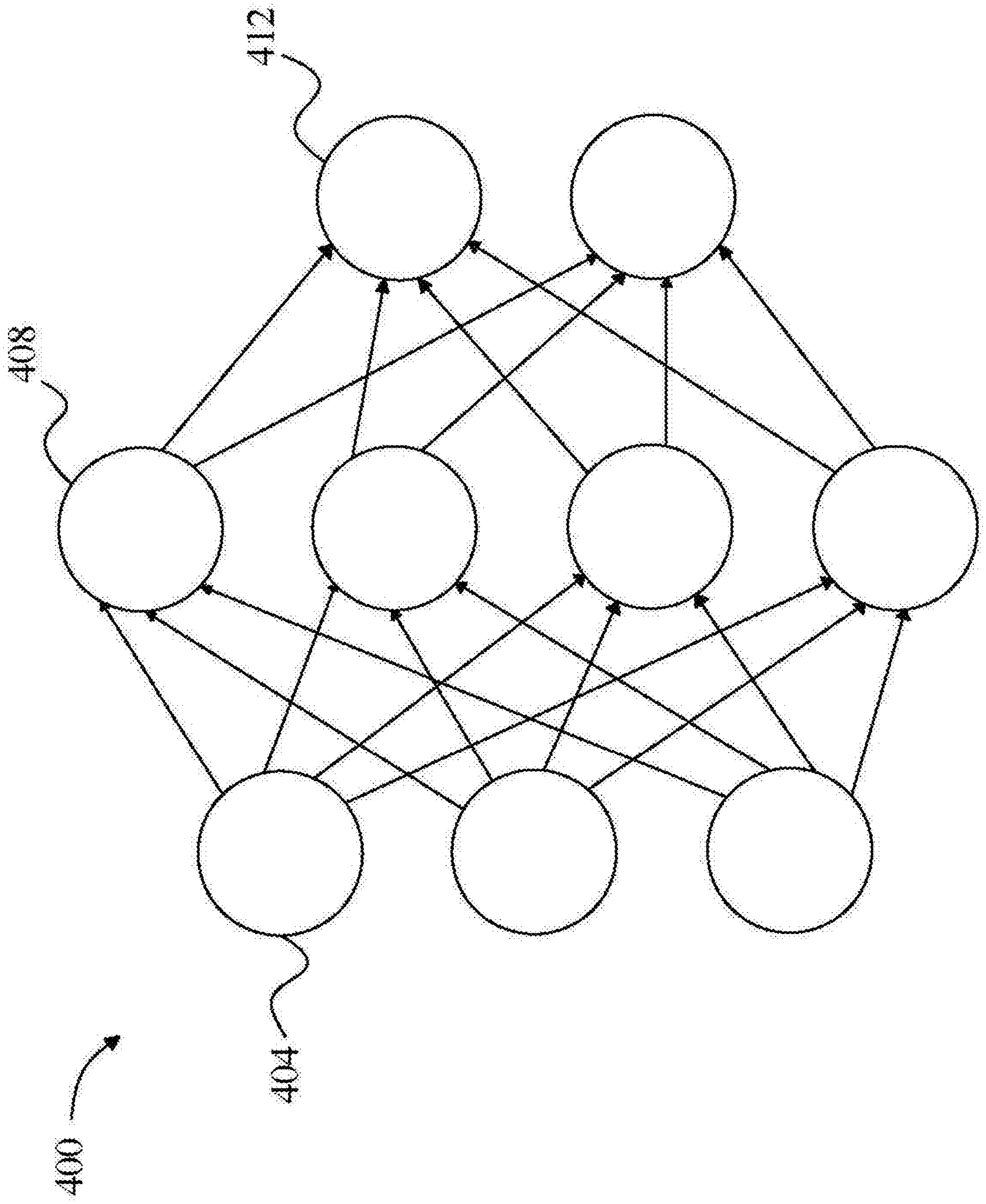
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
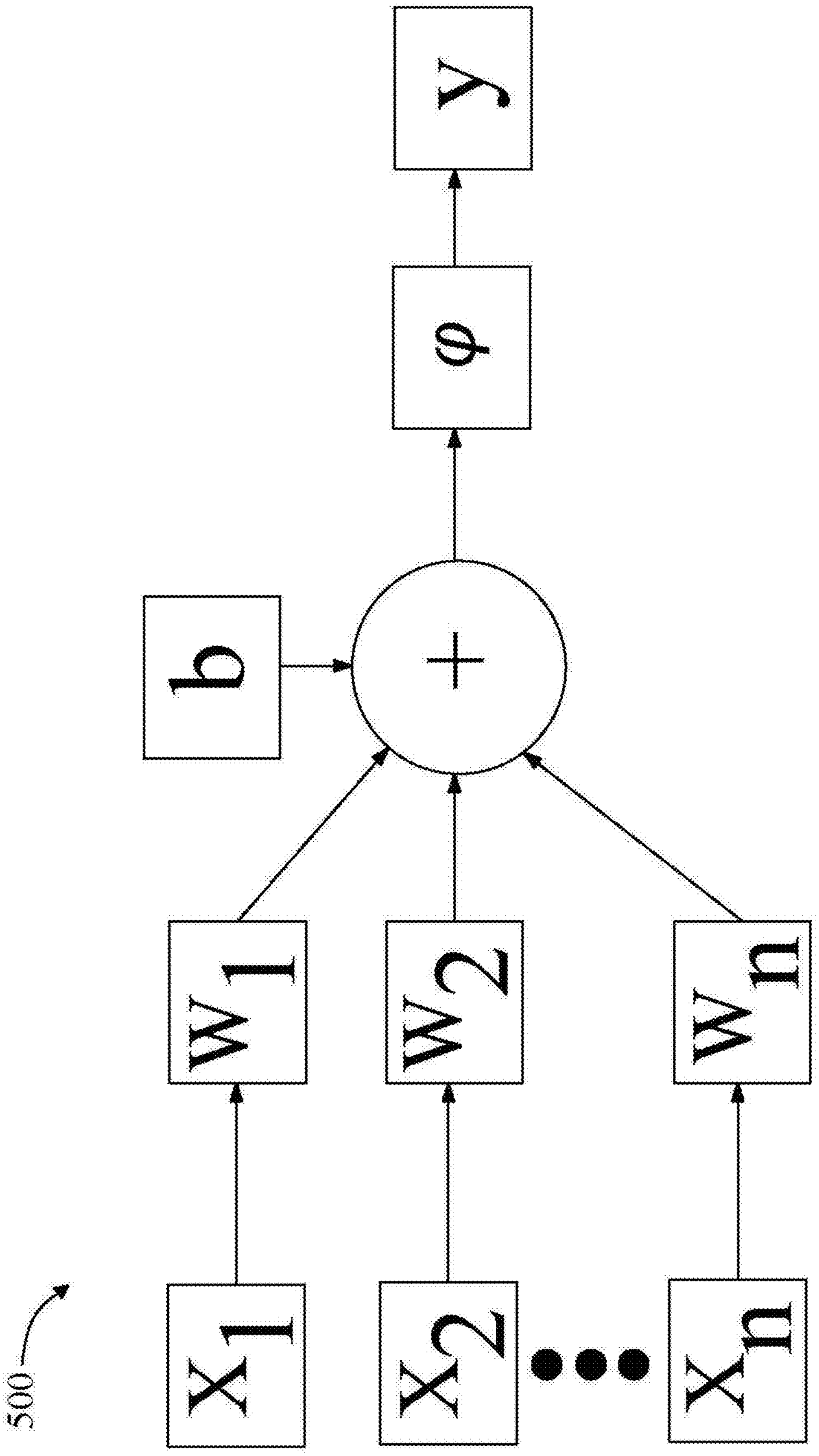
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tan h^2(x)$, a rectified linear unit function such as f(x)=max(0,x), a "leaky" and/or "parametric" rectified linear unit function such as f(x)=max (ax, x) for some a, an exponential linear units function such as $$f(x) = \begin{cases} x \text{ for } x \geq 0 \\ \alpha(e^x - 1) \text{ for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as $f(x)=a(1+\tan h(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function p, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
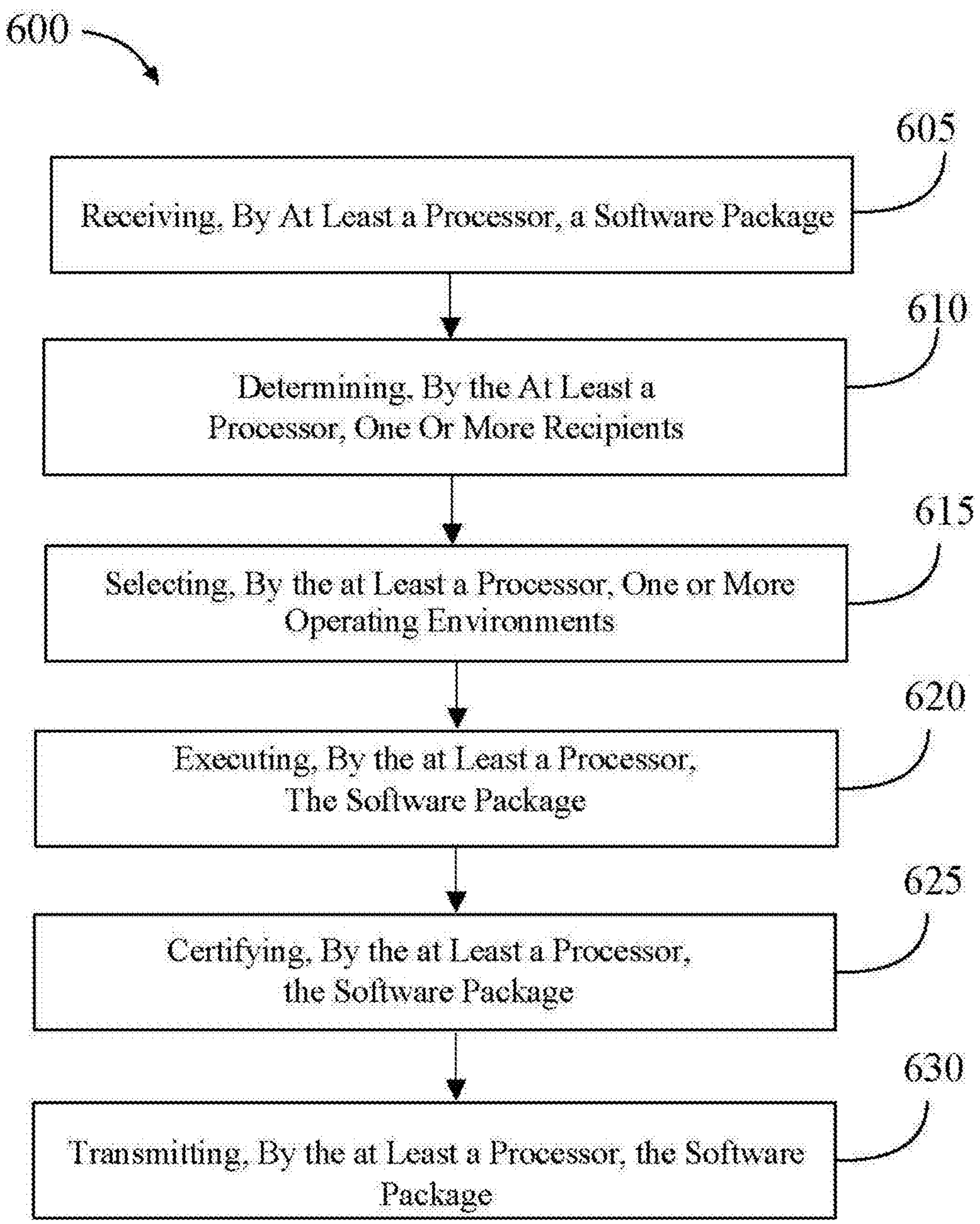
FIG. 6 is a flow diagram illustrating an exemplary embodiment of a method for certification of software within virtual integration environments.

Referring now to FIG. 6, a method 600 for certification of software within virtual integration environments is described. At step 605, method 600 includes receiving, by at least a processor, a software package for deployment. In one or more embodiments, the software package includes software parameters, and the software parameters differ for each operating environment. In one or more embodiments, the software package includes update data, wherein the update data is configured to modify an existing software. This may be implemented with reference to FIGS. 1-5 and without limitation.

With continued reference to FIG. 6, at step 610 method 600 includes determining, by the at least a processor, one or more recipients of the software package. This may be implemented with reference to FIGS. 1-5 and without limitation.

With continued reference to FIG. 6, at step 615 method 600 includes selecting, by the at least a processor, one or more operating environments as a function of the software package and the one or more recipients, wherein each operating environment of the one or more operating environments is a virtual representation of a system associated with each recipient of the one or more recipients. In one or more embodiments, selecting, by the at least a processor, the one or more operating environments as a function of the software package and the one or more recipients includes instantiating the one or more operating environments on a cloud network. In one or more embodiments, at least one operating environment of the one or more operating environments includes a digital twin associated with at least one recipient of the one or more recipients. In one or more embodiments, at least one operating environment of the one or more operating environments includes emulated hardware. In one or more embodiments, at least one operating environment of the one or more operating environments includes a simulated avionics system. This may be implemented with reference to FIGS. 1-5 and without limitation.

With continued reference to FIG. 6, at step 620 method 600 includes executing, by the at least a processor, the software package within the one or more operating environments. In one or more embodiments, executing software package may include generating, by the at least a processor, performance data for each operating environment of the one or more operating environments. In one or more embodiments, generating, by the at least a processor, the performance data for each operating environment of the one or more operating environments includes generating the performance data using a system profiler. In one or more embodiments, executing software package includes comparing, by the at least a processor, each performance data of the one or more performance data to one or more performance thresholds. In one or more embodiments, at least one operating environment of the one or more operating environments includes a design assurance level classification and comparing, by the at least a processor, the performance data to the one or more performance thresholds includes comparing the performance data to the one or more performance thresholds as a function of the design assurance level classification. In one or more embodiments, executing software package further includes graphically displaying by the at least a processor, at least the one or more performance data through a graphical user interface. In one or more embodiments, method 600 further includes generating, by the at least a processor, feedback data as a function of the comparison of the performance data to the one or more performance thresholds. In one or more embodiments, generating, by the at least a processor, the feedback data includes receiving feedback training data comprising a plurality of performance data and a plurality of performance thresholds as inputs correlated to a plurality of feedback data as an outputs, training a feedback machine learning model as a function of the feedback training data and generating the feedback data as a function of the feedback machine learning model. In one or more embodiments, generating, by the at least a processor, the feedback data further includes iteratively training the feedback machine learning model as a function of user input. In one or more embodiments, executing, by the at least a processor, the software package within the one or more operating environments includes receiving performance data from the one or more operating environments. In one or more embodiments, method 600 further includes generating, by the at least a processor, deviation data as a function of the comparison between the performance data and the operation data. In one or more embodiments, the deviation data includes one or more differences between at least one operating environment of the one or more operating environment and the system associated with the recipient. This may be implemented with reference to FIGS. 1-5 and without limitation.

With continued reference to FIG. 6, at step 625 method 600 includes certifying, by the at least a processor, the software package for each operating environment of the one or more operating environments. In one or more embodiments, certifying, by the at least a processor, the software package for each operating environment of the one or more operating environments includes comparing the performance data to one or more performance thresholds. In one or more embodiments, certifying, by the at least a processor, the software package includes digitally signing the software package. This may be implemented with reference to FIGS. 1-5 and without limitation.

With continued reference to FIG. 6, at step 630, method 600 includes transmitting, by the at least a processor, the certified software package to the one or more recipients. In one or more embodiments, transmitting, by the at least a processor, the certified software package includes dividing the certified software package into a plurality of data bundles and transmitting each data bundle of the plurality of data bundles to a participating node. This may be implemented with reference to FIGS. 1-5 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
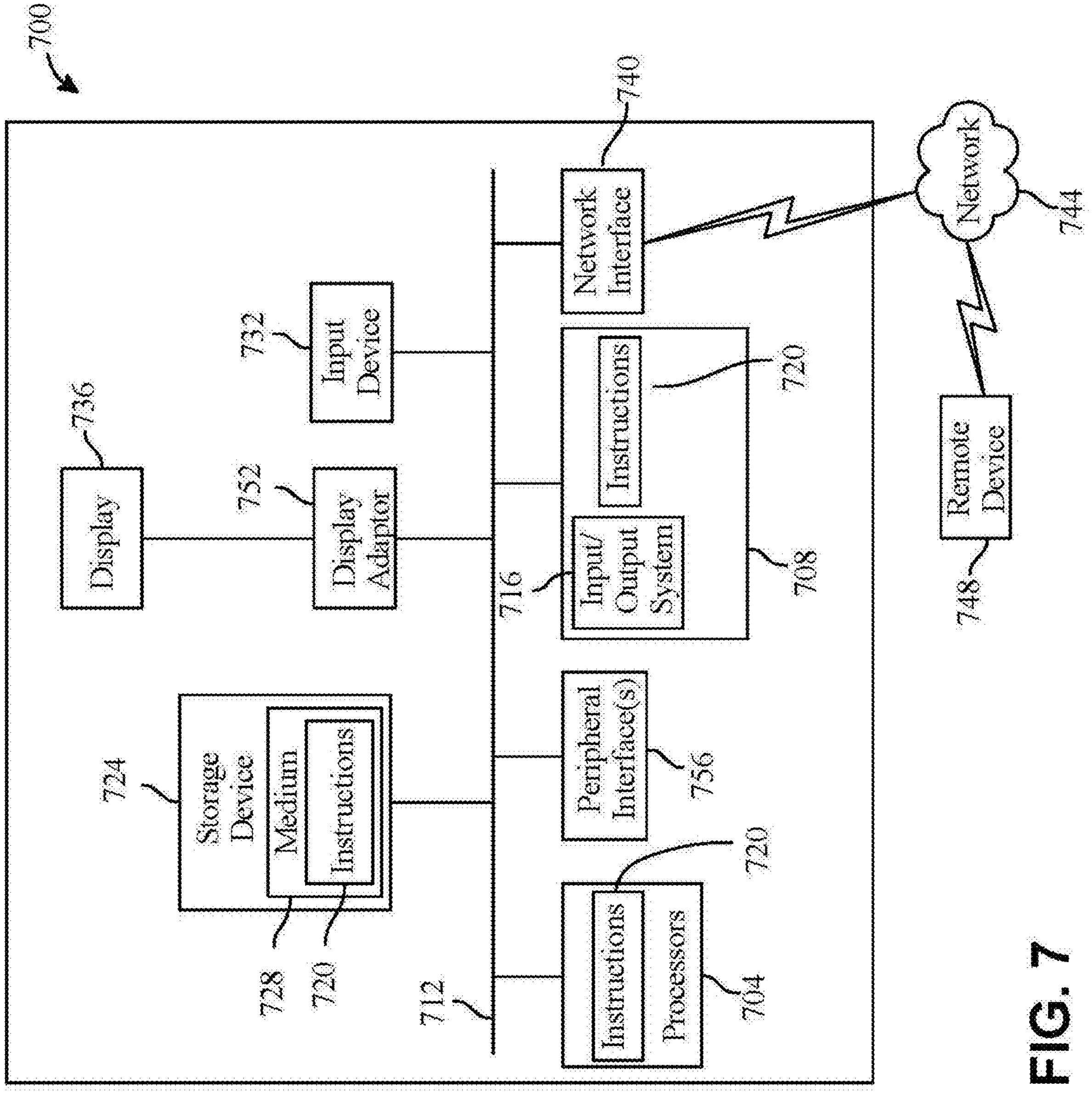
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for certification of software within virtual integration environments, the apparatus comprising:
- a processor; and
- a memory communicatively connected to the processor, the memory containing instructions configuring the processor to:
  - receive a software package for deployment, wherein the software package includes a design assurance level classification;
  - determine one or more recipients of the software package;
  - receive historical operation data from each system associated with the one or more recipients;
  - select one or more operating environments as a function of the software package and the one or more recipients, wherein each operating environment of the one or more operating environments comprises a virtual representation of a system associated with each recipient of the one or more recipients, wherein the virtual representation further includes a simulated avionics system, and wherein selecting the one or more operating environments further comprises modifying one or more parameters of the virtual representation as a function of the historical operation data to generate a recipient-specific calibrated virtual integration environment;
  - execute the software package within the one or more operating environments;
  - record a performance datum of the software package based on the execution;
  - certify the software package for each operating environment of the one or more operating environments based on the execution of the software package, wherein certifying the software package further comprises:
    - retrieving a plurality of preconfigured thresholds based on the design assurance level classification;
    - selecting a preconfigured threshold of the plurality of preconfigured thresholds as a function of the one or more operating environments;
    - comparing the performance datum to the preconfigured threshold; and
    - certifying the software package based on the comparison;
  - generate, for each operating environment, a cryptographic hash of the software package and configuration data defining the recipient-specific calibrated virtual integration environment;
  - bind a digital certificate to the cryptographic hash and to the design assurance level classification; and
  - transmit, using a delay tolerant network, the certified software package and the digital certificate to the one or more recipients.

2. The apparatus of claim 1, wherein certifying the software package comprises digitally signing the software package.

3. The apparatus of claim 1, wherein:
- executing the software package within the one or more operating environments comprises receiving performance data associated with the software package from the one or more operating environments; and
- certifying the software package for each of the one or more operating environments comprises comparing the performance data to one or more performance thresholds.

4. The apparatus of claim 1, wherein the software package comprises software parameters and wherein the software parameters differ for each of the one or more operating environments.

5. The apparatus of claim 1, wherein the software package comprises update data configured to modify an existing software.

6. The apparatus of claim 1, wherein transmitting the certified software package comprises:
- dividing the certified software package into a plurality of data bundles; and
- transmitting each data bundle of the plurality of data bundles to a participating node.

7. The apparatus of claim 1, wherein the processor is further configured to iteratively receive the historical loperation data from the one or more recipients, wherein the historical operation data comprises interaction data associated with an outside environment.

8. The apparatus of claim 1, wherein:
- executing the software package within the one or more operating environments comprises receiving performance data associated with the software package from the one or more operating environments; and
- the processor is further configured to generate deviation data as a function of the comparison between the performance data and the historical operation data.

9. The apparatus of claim 8, wherein the deviation data comprises one or more differences between at least one operating environment of the one or more operating environments and the system associated with each recipient.

10. The apparatus of claim 1, wherein certifying the software further comprises:

inputting performance data and the preconfigured threshold into a feedback machine learning model;

outputting feedback data from the feedback machine learning model; and certifying the software using the feedback data.

11. A method for certification of software within virtual integration environments, the method comprising:

receiving, by at least a processor, a software package for deployment;

determining, by the at least a processor, one or more recipients of the software package, wherein the software package includes a design assurance level classification;

receiving, by the at least a processor, operation data from each system associated with the one or more recipients;

selecting, by the at least a processor, one or more operating environments as a function of the software package and the one or more recipients, wherein each operating environment of the one or more operating environments comprises a virtual representation of a system associated with each recipient of the one or more recipients, wherein the virtual representation further includes a simulated avionics system, and wherein selecting the one or more operating environments further comprises modifying one or more parameters of the virtual representation as a function of the operation data to generate a recipient-specific calibrated virtual integration environment;

executing, by the at least a processor, the software package within the one or more operating environments;

recording a performance datum of the software package based on the execution;

certifying, by the at least a processor, the software package for each operating environment of the one or more operating environments based on the execution of the software package, wherein certifying the software package further comprises:

retrieving a plurality of preconfigured thresholds based on the design assurance level classification;

selecting a preconfigured threshold of the plurality of preconfigured thresholds as a function of the one or more operating environments;

comparing the performance datum to the preconfigured threshold; and certifying the software package based on the comparison;

generating, for each operating environment, a cryptographic hash of the software package and configuration data defining the recipient-specific calibrated virtual integration environment;

binding a digital certificate to the cryptographic hash and to the design assurance level classification; and transmitting, by the at least a processor and using a delay tolerant network, the certified software package and the digital certificate to the one or more recipients.

12. The method of claim 11, wherein certifying, by the at least a processor, the software package comprises digitally signing the software package.

13. The method of claim 11, wherein:

executing, by the at least a processor, the software package within the one or more operating environments comprises receiving performance data associated with the software package from the one or more operating environments; and certifying, by the at least a processor, the software package for each of the one or more operating environments comprises comparing the performance data to one or more performance thresholds.

14. The method of claim 11, wherein the software package comprises software parameters and wherein the software parameters differ for each of the one or more operating environments.

15. The method of claim 11, wherein the software package comprises update data configured to modify an existing software.

16. The method of claim 11, wherein transmitting, by the at least a processor, the certified software package comprises:

dividing the certified software package into a plurality of data bundles; and transmitting each data bundle of the plurality of data bundles to a participating node.

17. The method of claim 11, wherein the method further comprises receiving, by the at least a processor, the operation data from the one or more recipients, wherein the operation data comprises interaction data associated with an outside environment.

18. The method of claim 11, wherein:

executing, by the at least a processor, the software package within the one or more operating environments comprises receiving performance data associated with the software package from the one or more operating environments; and the method further comprises generating, by the at least a processor, deviation data as a function of the comparison between the performance data and the operation data.

19. The method of claim 18, wherein the deviation data comprises one or more differences between at least one operating environment of the one or more operating environment and the system associated with each recipient.

20. The method of claim 11, wherein certifying the software further comprises:

inputting performance data and the preconfigured threshold into a feedback machine learning model;

outputting feedback data from the feedback machine learning model; and certifying the software using the feedback data.

* * * * *